United States Patent
Ichihashi

(10) Patent No.: US 10,338,288 B2
(45) Date of Patent: *Jul. 2, 2019

(54) REFLECTION MEMBER, PROJECTION SCREEN, COMBINER, AND HEAT SHIELD MEMBER

(71) Applicant: FUJIFILM Corporation, Tokyo (JP)

(72) Inventor: Mitsuyoshi Ichihashi, Ashigarakami-gun (JP)

(73) Assignee: FUJIFILM Corporation, Tokyo (JP)

(*) Notice: Subject to any disclaimer, the term of this patent is extended or adjusted under 35 U.S.C. 154(b) by 192 days.

This patent is subject to a terminal disclaimer.

(21) Appl. No.: 15/260,938

(22) Filed: Sep. 9, 2016

(65) Prior Publication Data

US 2016/0377776 A1    Dec. 29, 2016

Related U.S. Application Data

(63) Continuation of application No. PCT/JP2015/058158, filed on Mar. 19, 2015.

(30) Foreign Application Priority Data

Mar. 20, 2014   (JP) ................ 2014-058528

(51) Int. Cl.
*G02B 1/11* (2015.01)
*G02B 5/30* (2006.01)
(Continued)

(52) U.S. Cl.
CPC ............ *G02B 5/3016* (2013.01); *G02B 1/11* (2013.01); *G02B 5/26* (2013.01); *G02B 5/3083* (2013.01);
(Continued)

(58) Field of Classification Search
CPC ... G02F 1/133536; G02F 2001/133543; G02F 2001/133521; G02F 1/133533;
(Continued)

(56) References Cited

U.S. PATENT DOCUMENTS 5,050,966 A    9/1991   Berman
7,142,360 B2  11/2006   Umeya
(Continued)

FOREIGN PATENT DOCUMENTS

JP   H02-132411 A   5/1990
JP   H05-107660 A   4/1993
(Continued)

OTHER PUBLICATIONS

International Preliminary Report on Patentability issued from the International Bureau in counterpart International Application No. PCT/JP2015/058158, dated Sep. 20, 2016.
(Continued)

*Primary Examiner* — Charles S Chang
(74) *Attorney, Agent, or Firm* — Sughrue Mion, PLLC

(57) ABSTRACT

Due to the present invention, a reflection member including two or more layers of fixed cholesteric liquid crystal phases, in which the two or more layers of fixed cholesteric liquid crystal phases exhibit central wavelengths of mutually different selective reflection, and the two or more layers of fixed cholesteric liquid crystal phases include a layer formed of a composition including a disc-like liquid crystal compound and a layer formed of a composition including a rod-like liquid crystal compound and a projected image display member and a heat shield member which include the reflection member are provided. The reflection member of the present invention has favorable selective reflection characteristics with respect to oblique incidence rays.

19 Claims, 3 Drawing Sheets

(THICKNESS 0.4 mm)

(51) Int. Cl.
*G03B 21/604* (2014.01)
*G02B 27/01* (2006.01)
*G03B 21/28* (2006.01)
*G03B 21/56* (2006.01)
*G03B 21/16* (2006.01)
*G02B 5/26* (2006.01)

(52) U.S. Cl.
CPC ......... *G02B 27/0101* (2013.01); *G03B 21/16* (2013.01); *G03B 21/28* (2013.01); *G03B 21/567* (2013.01); *G03B 21/604* (2013.01); *G02B 2027/013* (2013.01); *G02B 2027/0112* (2013.01); *G02B 2027/0194* (2013.01)

(58) Field of Classification Search
CPC .... G02B 5/3016; G02B 27/0101; G02B 1/11; G02B 5/3083; G02B 5/26; G02B 2027/0112; G02B 2027/013; G02B 2027/0194; G03B 21/604; G03B 21/28; G03B 21/567; G03B 21/16
See application file for complete search history.

(56) References Cited

U.S. PATENT DOCUMENTS

| | | | |
|---|---|---|---|
| 7,365,906 | B2 | 4/2008 | Umeya |
| 2002/0021392 | A1 | 2/2002 | Ohtake et al. |
| 2004/0252373 | A1 | 12/2004 | Umeya |
| 2007/0019290 | A1 | 1/2007 | Umeya |
| 2012/0242948 | A1* | 9/2012 | Taguchi .................. G02B 5/26 349/191 |
| 2016/0170114 | A1 | 6/2016 | Watano et al. |
| 2016/0342003 | A1 | 11/2016 | Takeda et al. |

FOREIGN PATENT DOCUMENTS

| | | |
|---|---|---|
| JP | 2001-305520 A | 10/2001 |
| JP | 2005-3823 A | 1/2005 |
| JP | 2015-194675 A | 11/2015 |
| JP | WO2015/122479 A1 | 3/2017 |
| WO | 2015/122479 A1 | 8/2015 |

OTHER PUBLICATIONS

International Search Report of PCT/JP2015/058158, dated Jun. 23, 2015. [PCT/ISA/210].

Written Opinion of PCT/JP2015/058158, dated Jun. 23, 2015. [PCT/ISA/237].

Office Action dated Aug. 8, 2017, from the Japanese Patent Office in counterpart Japanese Application No. 2016-508778.

Office Action dated Jan. 30, 2018 from the Japanese Patent Office in counterpart Japanese Application No. 2016-508778.

* cited by examiner

REFLECTION MEMBER, PROJECTION SCREEN, COMBINER, AND HEAT SHIELD MEMBER

CROSS-REFERENCE TO RELATED APPLICATIONS

This application is a continuation of PCT International Application No. PCT/JP2015/058158 filed on Mar. 19, 2015, which claims priority under 35 U.S.C § 119 (a) to Japanese Patent Application No. 2014-058528 filed on Mar. 20, 2014, the entire content of which is incorporated herein by reference.

BACKGROUND OF THE INVENTION

1. Field of the Invention

The present invention relates to a reflection member including a layer of fixed cholesteric liquid crystal phase. The present invention also relates to a projection screen, a combiner, and a heat shield member which include the reflection member.

2. Description of the Related Art

Layers of fixed cholesteric liquid crystal phases are known as layers exhibiting so-called selective reflection as properties of selectively reflecting any one of right circularly polarized light or left circularly polarized light in specific wavelength ranges, and there have thus far been proposals of using layers of fixed cholesteric liquid crystal phases as reflection members such as projection screens using the above-described function (for example, JP1993-107660A (JP-H05-107660A) and JP2005-3823A).

SUMMARY OF THE INVENTION

When films including layers of fixed cholesteric liquid crystal phases are used as projection screens and the like, constitutions having a plurality of selective wavelength ranges in the visible light range are preferred, and, in this case, generally, a plurality of layers of fixed cholesteric liquid crystal phases are required. However, when laminated films are used as reflection members, there are cases in which selective reflection characteristics with respect to oblique incidence rays degrade. In addition, it has been clarified in the process of studies by the present inventors that the degree of circular polarization of light reflected by layers of fixed cholesteric liquid crystal phases particularly at portions far from the incidence ray side degrades.

An object of the present invention is to provide a reflection member which includes a layer of fixed cholesteric liquid crystal phase and has favorable selective reflection characteristics with respect to oblique incidence rays. In addition, another object of the present invention is to provide a projection screen, a combiner, and a heat shield member which have favorable reflection characteristics with respect to oblique incidence rays.

The present inventors carried out intensive studies in order to solve the above-described problems and found that, when reflection members having constitutions in which layers for which different compounds are used as liquid crystal compounds for forming cholesteric liquid crystalline phases are laminated are used, reflection characteristics are improved. On the basis of this finding, the present inventors further repeated studies and completed the present invention.

That is, the present invention provides the following [1] to [15].

[1] A reflection member comprising two or more layers of fixed cholesteric liquid crystal phases, in which the two or more layers of fixed cholesteric liquid crystal phases exhibit central wavelengths of mutually different selective reflection, and the two or more layers of fixed cholesteric liquid crystal phases include a layer formed of a composition including a disc-like liquid crystal compound and a layer formed of a composition including a rod-like liquid crystal compound.

[2] The reflection member according to [1], in which a difference in an absolute value of Rth at a wavelength of 550 nm between the layer formed of a composition including a disc-like liquid crystal compound and the layer formed of a composition including a rod-like liquid crystal compound is 100 nm or smaller.

[3] The reflection member according to [1] or [2], in which, out of the two or more layers of fixed cholesteric liquid crystal phases, two layers closest to any one surface side of the reflection member consist of the layer formed of a composition including a disc-like liquid crystal compound and the layer formed of a composition including a rod-like liquid crystal compound.

[4] The reflection member according to any one of [1] to [3] which is a film for forming projected images using reflected light.

[5] The reflection member according to [3] which is a film for forming projected images using reflected light on the above-described surface side.

[6] The reflection member according to any one of [1] to [5], comprising: a layer of fixed cholesteric liquid crystal phase which has a central wavelength of selective reflection in a red wavelength range, a layer of fixed cholesteric liquid crystal phase which has a central wavelength of selective reflection in a green wavelength range, and a layer of fixed cholesteric liquid crystal phase which has a central wavelength of selective reflection in a blue wavelength range.

[7] The reflection member according to [6], in which the red wavelength range is 600 nm to 650 nm, the green wavelength range is 500 nm to 600 nm, and the blue wavelength range is 430 nm to 480 nm.

[8] The reflection member according to any one of [1] to [7], in which a haze value measured from any one surface is 2.0% or higher.

[9] A projection screen comprising: the reflection member according to [8].

[10] A combiner for head up displays comprising: the reflection member according to any one of [1] to [7].

[11] The combiner for head up displays according to [10], comprising: the two or more layers of fixed cholesteric liquid crystal phases and a base material in this order, and an antireflection layer(s) on any one or both surface(s).

[12] The combiner for head up displays according to [11], comprising: the base material, the two or more layers of fixed cholesteric liquid crystal phases, and an antireflection layer in this order, in which an in-plane retardation in the base material at a wavelength of 550 nm is 50 nm or less.

[13] The combiner for head up displays according to [11], comprising: the two or more layers of fixed cholesteric liquid crystal phases, the base material, and an antireflection layer in this order.

[14] A heat shield member comprising the reflection member according to any one of [1] to [7].

[15] The heat shield member according to [14] comprising: a ¼ wavelength phase difference plate.

The present invention provides reflection members having favorable reflection characteristics with respect to oblique incidence rays. Particularly, the present invention provides reflection members exhibiting selective reflection having high degrees of circular polarization even with respect to oblique incidence rays. The reflection member of the present invention can be suitably used as projected image display members such as projection screens or combiners in head up displays, heat shield members, and dichroic mirrors.

DESCRIPTION OF THE PREFERRED EMBODIMENTS

Figure 1:
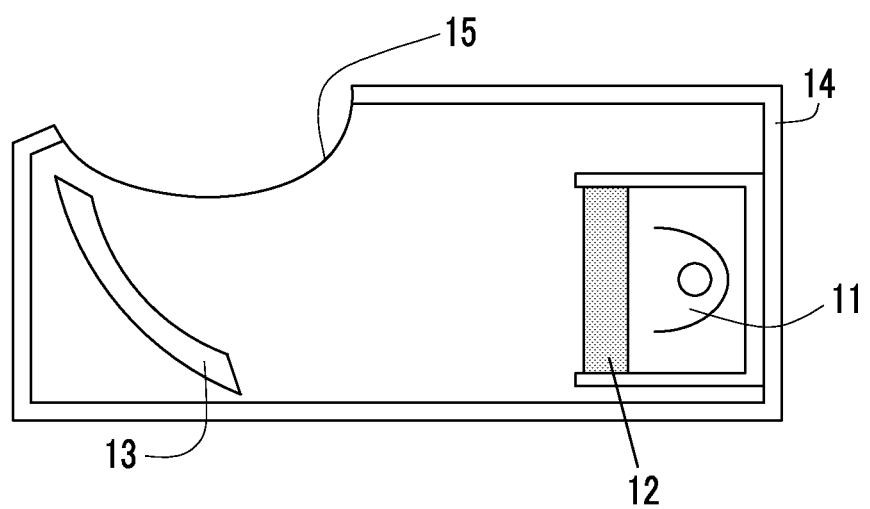
FIG. 1 is a view illustrating a schematic sectional view of an example of a projector for head up displays.

Hereinafter, the present invention will be described in detail.

Meanwhile, in the present invention, numeric ranges expressed using "to" include numeric values before and after the "to" as the lower limit value and the upper limit value. In addition, in the present invention, angles (for example, angles such as "90°") and angular relationships (for example, "orthogonal", "parallel", "intersecting at 45°", and the like) include error ranges permitted in technical fields to which the present invention belongs. For example, angles refer to angles in a range of the exact angle an error of smaller than ±10°, and the error from the exact angle is preferably 5° or smaller and more preferably 3° or smaller.

In the present specification, when circular polarization is mentioned as "being selective", it means that the amount of light of any one of the right circular polarization component and the left circular polarization component of light being radiated is greater than that of the other circular polarization component. Specifically, when circular polarization is mentioned as "being selective", the degree of circular polarization of light is preferably 0.3 or higher, more preferably 0.6 or higher, and still more preferably 0.8 or higher. Substantially, the degree of circular polarization is still more preferably 1.0. Here, the degree of circular polarization refers to a value represented by $|I_R-I_L|/(I_R+I_L)$ in which $I_R$ represents the intensity of the right circular polarization component of light, and $I_L$ represents the intensity of the left circular polarization component of light. In the present specification, in order to express ratios between the circular polarization components of light, there are cases in which the degrees of circular polarization are used.

In the present specification, when "sense" is mentioned regarding circular polarization, the sense indicates whether the circular polarization is right circular polarization or left circular polarization. Regarding the sense of circular polarization, in a case in which light coming closer is observed, in a case in which the distal end of an electric field vector revolves clockwise as the time elapses, the circular polarization is defined as right circular polarization, and, in a case in which the distal end thereof revolves counterclockwise, the circular polarization is defined as left circular polarization.

In the present specification, there are also cases in which a terminology of "sense" is used regarding the twisted directions of the helices of cholesteric liquid crystals. In a case in which the twisted direction (sense) of the helix of cholesteric liquid crystals is right, selective reflection by the cholesteric liquid crystals reflects right circularly polarized light and transmits left circularly polarized light, and, in a case in which the sense is left, the selective reflection reflects left circularly polarized light and transmits right circularly polarized light.

In the present specification, the intensity of light which is required in association with the computation of light transmittance may be measured using the air as a reference and, for example, an ordinary visible spectrometer.

In the present specification, when simply "reflected light" or "transmitted light" is mentioned, scattered light and diffracted light are also considered to be included in the scope of the light.

Meanwhile, the polarization state of each wavelength of light can be measured using a spectral emission luminance meter or a spectrometer which is equipped with a circular polarization plate. In this case, the intensity of light measured using a right circular polarization plate corresponds to $I_R$, and the intensity of light measured using a left circular polarization plate corresponds to $I_L$. In addition, ordinary light sources such as incandescent bulbs, mercury lamps, fluorescent lamps, and LEDs almost emit natural light, but characteristics that cause the polarization of measurement subjects mounted in ordinary light sources such as members for displaying projected images can be measured using, for example, a polarization phase difference analyzer AxoScan manufactured by AXOMETRICS, Inc. or the like.

In addition, polarization states can also be measured by attaching measurement subjects to illuminometers or optical spectrometers. When the amount of right circularly polarized light is measured with a right circular polarization transmission plate attached thereto, and the amount of left circular polarization is measured with a left circular polarization transmission plate attached thereto, the ratio therebetween can be measured.

In the present specification, Re (λ) and Rth (λ) respectively represent in-plane retardation and retardation in the thickness direction at a wavelength of λ.

In the present specification, Re (λ) is measured using a polarization phase difference analyzer AxoScan manufactured by Axometrics, Inc. Re (λ) can also be measured by making light having a wavelength of λ nm incident in a film normal direction in a KOBRA 21ADH or WR (manufactured by Oji Scientific Instruments).

Generally, the retardation Rth in a certain layer in the film thickness direction is defined by the following expression.

$$Rth=\{(nx+ny)/2-nz\} \times d$$

In the above-described expression, nx represents the refractive index in a slow axis direction in a plane, ny represents the refractive index in a direction orthogonal to nx in the plane, nz represents the refractive index in a direction orthogonal to nx and ny, and d represents the film thickness. In layers of fixed cholesteric liquid crystal phases, when the ordinary light refractive index no and the extraordinary light refractive index ne are used, the average value of the refractive indexes in a plane (nx+ny)/2 is represented by (nx+ny)/2=(no+ne)/2.

In addition, since the refractive index in the film thickness direction reaches no, Rth of layers of fixed cholesteric liquid crystal phases is represented by the following expression. As Rth's of individual layers of fixed cholesteric liquid crystal phases in the reflection member of the present invention, values calculated using the following expression are employed, and Rth's of individual layers at a wavelength of λ nm are denoted as Rth (λ).

$$Rth=\{(no+ne)/2-no\} \times d=\{(ne-no)/2\} \times d$$

Meanwhile, ne and no can be measured using Abbe refractometers.

In addition, as methods for obtaining Rth's of cholesteric layers, it is possible to apply methods in which an ellipsometer is used. For example, the thickness, pitch, twisting angle, and the like of a cholesteric layer are obtained using the method in which an ellipsometer is used as described in M. Kimura et al. Jpn. J. Appl. Phys. 48 (2009) 03B021, and the value of Rth can be obtained from the above-described factors.

<Reflection Member>

Reflection members have a function of reflecting light. The reflection member of the present invention is preferably a member that selectively reflects light, particularly, in specific wavelength ranges.

Light reflected by reflection members is not particularly limited and may be, for example, light in the wavelength range of infrared rays, in the wavelength range of visible light rays, or in the wavelength range of ultraviolet rays.

Infrared rays (infrared light) are electromagnetic waves in wavelength ranges that are longer than those of visible light rays and shorter than those of electronic waves. Near-infrared light is generally electromagnetic waves in a wavelength range of 700 nm to 2,500 nm. Visible light rays are, out of electromagnetic waves, light having wavelengths that are visible to human eyes and refer to light in a wavelength range of 380 nm to 780 nm. Ultraviolet rays are electromagnetic waves in wavelength ranges that are shorter than those of visible light rays and longer than those of X-rays. Ultraviolet rays may be any light in wavelength ranges which is differentiated from visible light rays and X-rays and are, for example, light in a wavelength range of 10 nm to 420 nm.

Reflection members may have a function of reflecting at least light having any wavelengths. Reflection members may have a function of reflecting light at specific wavelengths and also have a function of transmitting or absorbing light at the same wavelengths. In addition, reflection members may have a function of reflecting light at specific wavelengths and also have a function of transmitting or absorbing light at other wavelengths.

The reflection member of the present invention is preferably used particularly in a form in which reflected light is used or in a form in which a reflection function is used. For example, the reflection member is preferably a film for forming projected images by reflecting visible light or a film that shields heat by reflecting infrared light or visible light. The reflection member of the present invention preferably does not include any luminance-improving films that are used in a form of being embedded in liquid crystal display devices.

(Constitution of Reflection Member)

The reflection member of the present invention includes at least two layers of fixed cholesteric liquid crystal phases. In the present specification, in some cases, layers of fixed cholesteric liquid crystal phases will be referred to as cholesteric liquid crystal layers or liquid crystal layers. The reflection member of the present invention preferably includes three or more cholesteric liquid crystal layers.

The reflection layer may include, in addition to cholesteric liquid crystal layers, layers such as antireflection layers, alignment layers, supports, adhesive layers, and base materials described below.

In a case in which the reflection member is a projection screen that displays projected images on the surface as real images, the reflection member may include light shield layers that reflect or absorb light. In addition, furthermore, the reflection member may include antireflection layers or hardcoat layers on the surface side which serves as the outermost surface on a viewing side. In a case in which a member for displaying projected images is a half mirror that displays projected images as virtual images which appear in a buoyant state ahead of the member for displaying projected images to observers, the member preferably does not include any light shield layers that reflect or absorb light. This is to obtain high transparency (visible light-transmitting properties of 60% or higher and preferably 70% or higher) for visual observation of surrounding landscapes or visual observation of information on a side opposite to the member for displaying projected images.

The reflection member may have a film shape, a sheet shape, a plate shape, or the like of thin films. The reflection member may have a planar shape that does not include any curved surfaces, but may have curved surfaces and may have a concave or convex shape as a whole. The reflection member of the present invention has favorable reflection characteristics with respect to oblique incidence rays and also exhibits selective reflection with a high degree of circular polarization with respect to oblique incidence rays. Therefore, the reflection member of the present invention can be preferably used as films that easily receive oblique incidence rays and have shapes including curved surfaces.

In addition, the reflection member may be adhered to another member and then be formed into a shape having curved surfaces or a concave or convex shape or may be formed into a roll shape or the like as a thin film before being adhered.

(Layers of Fixed Cholesteric Liquid Crystal Phases: Cholesteric Liquid Crystal Layers)

The cholesteric liquid crystal layer functions as a circular polarization selective reflection layer that, in selective reflection bands (selective reflection wavelength ranges), selectively reflects any one of right circularly polarized light and left circularly polarized light and transmits circularly polarized light having the other sense. That is, the sense of circularly polarized light being reflected is left when the sense of circularly polarized light being transmitted is right, and the sense of circularly polarized light being reflected is right when the sense of circularly polarized light being transmitted is left. Due to the above-described function of the cholesteric liquid crystalline layer, it is possible to form projected images by reflecting circularly polarized light having any one sense out of projected light at wavelengths at which selective reflection is exhibited.

As films that exhibit circular polarization selective reflection properties, a number of films formed of compositions including polymerizable liquid crystal compounds have been thus far known, and, regarding the layers of fixed cholesteric liquid crystal phases (cholesteric liquid crystal layers), it is possible to refer to the related art thereof.

The cholesteric liquid crystal layer needs to be a layer in which the alignment of liquid crystal compounds forming cholesteric liquid crystalline phases is held and, typically, needs to be a layer which is obtained by forming a nonfluidic layer by polymerizing and hardening polymerizable liquid crystal compounds that have been put into an alignment state of cholesteric liquid crystalline phases by means of irradiation with ultraviolet rays, heating, or the like and, at the same time, changing the layer into a state in which the alignment states are not changed due to external fields or external forces. Meanwhile, in the cholesteric liquid crystal layer, the optical properties of cholesteric liquid crystalline phases need to be held in the layer, and liquid crystal compounds in the layer does not need to exhibit liquid crystallinity any longer. For example, polymerizable liquid crystal compounds may be polymerized by means of hardening reactions and thus may lose liquid crystallinity.

The cholesteric liquid crystal layer exhibits circular polarization reflection derived from the helix structures of cholesteric liquid crystals. In the present specification, this circular polarization reflection will be referred to as selective reflection.

The central wavelength $\lambda$ of selective reflection is dependent on the pitch length P of the helix structure (=the period of the helix) in cholesteric phases and follows a relationship of $\lambda = n \times P$ with the average refractive index n of the cholesteric liquid crystal layer. The average refractive index n is (no+ne)/2 described above. Meanwhile, in the present specification, the central wavelength $\lambda$ of selective reflection in the cholesteric liquid crystal layer refers to a wavelength present at the location of the center of gravity of a reflection peak in a circular polarization reflection spectrum measured in the normal direction to the cholesteric liquid crystal layer. As is clear from the above-described equation, the central wavelength of selective reflection can be adjusted by adjusting the pitch of the helix structure. That is, in order to selectively reflect, for example, any one of right circularly polarized light and left circularly polarized light with respect to blue light by adjusting the n value and the P value, it is possible to adjust the central wavelength $\lambda$ to be in a range of 430 nm to 480 nm. Since the pitch of the cholesteric liquid crystalline phase is dependent on the kind of chiral agents that are used together with the polymerizable liquid crystal compound or the concentration of the chiral agents added, and thus it is possible to obtain a desired pitch length by adjusting the kind and the concentration thereof. Meanwhile, regarding methods for measuring the sense or pitch of the helix, it is possible to use the method described in p. 46 of "Introduction to Experimental Liquid Crystal Chemistry", by the Japanese Liquid Crystal Society, published by Sigma Publishing Co., Ltd. (2007) and p. 196 of "Liquid Crystal Handbook", by the editorial committee of liquid crystal handbook, published by Maruzen Publishing Co., Ltd.

As the respective cholesteric liquid crystal layers, cholesteric liquid crystal layers in which the senses of the helices are either right or left are used. The sense of reflected circularly polarized light in the cholesteric liquid crystal layer coincides with the sense of the helix.

The half-width $\Delta\lambda$ (nm) of the selective reflection band in which circular polarization selective reflection is exhibited is dependent on the birefringence $\Delta n$ of liquid crystal compounds and the pitch P and follows a relationship of $\Delta\lambda = \Delta n \times P$. Therefore, the width of the selective reflection band can be controlled by adjusting $\Delta n$. $\Delta n$ can be adjusted by adjusting the kind of polymerizable liquid crystal compounds or a mixing ratio thereof or by controlling temperatures during the fixing of alignment.

In order to form one kind of cholesteric liquid crystal layers having the same central wavelength of selective reflection, multiple cholesteric liquid crystal layers having the same period P and the same sense of helices may be laminated together. When multiple cholesteric liquid crystal layers having the same period P and the same sense of helices are laminated together, it is possible to enhance circular polarization selectivity at specific wavelengths.

The width of the selective reflection band is, generally, approximately 15 nm to 100 nm for one kind of material in, for example, the visible light range. In order to broaden the width of the selective reflection band, two or more kinds of cholesteric liquid crystal layers in which the central wavelengths of reflected light having changed periods P are different need to be laminated together. At this time, cholesteric liquid crystal layers having the same sense of helices are preferably laminated together. In addition, in one cholesteric liquid crystal layer, the width of the selective reflection band can also be broadened by slowly changing the period P in the film thickness direction. The width of the selective reflection band is not particularly limited, but may be a wavelength width such as 1 nm, 10 nm, 50 nm, 100 nm, 150 nm, or 200 nm. The width is preferably a width of approximately 100 nm or smaller.

In a case in which the reflection member of the present invention is used as a member for displaying projected images, the reflection member preferably includes cholesteric liquid crystal layers respectively having central wavelengths of selective reflection with respect to light in red wavelength ranges, light in green wavelength ranges, and light in blue wavelength ranges.

The red wavelength ranges, the green wavelength ranges, or the blue wavelength ranges respectively refer to wavelength ranges of light exhibiting red color, wavelength ranges of light exhibiting green color, or wavelength ranges of light exhibiting blue color. Persons skilled in the art are able to naturally understand specific wavelength ranges of the respective wavelength ranges. The red wavelength range, the green wavelength range, or the blue wavelength range may also be determined in accordance with the use of the reflection member. For example, in a case in which the reflection member is used as a member for displaying projected images, the wavelength ranges may be determined in accordance with the wavelengths of projected light from optical systems in projectors. For example, in projectors for displaying full-color projected images, typically, projected light has the maximum intensity of light in each of red wavelength ranges, green wavelength ranges, and blue wavelength ranges, but it is possible to determine the red wavelength ranges, the green wavelength ranges, or the blue wavelength ranges by confirming the wavelength ranges on the basis of the light emission spectra or the like of light sources. For example, in reflection members that display projected images using projected light from projectors in which a laser is used as a light source or reflection members used as heat shielding members in optical systems in which a laser is used as a light source, the red wavelength ranges, the green wavelength ranges, or the blue wavelength ranges can be narrowed.

The red wavelength ranges may be specifically, for example, 600 nm to 650 nm. The green wavelength ranges may be specifically, for example, 500 nm to 600 nm. In addition, the blue wavelength ranges may be specifically, for example, 430 nm to 480 nm.

The central wavelengths of selective reflection of cholesteric liquid crystal layers being used may be adjusted in accordance with the use thereof. For example, when the central wavelength of selective reflection is adjusted in accordance with the wavelengths of projected light from projectors, it is possible to display clear projected images with favorable light use efficiencies. Particularly, when the central wavelengths of selective reflection of multiple cholesteric liquid crystal layers are respectively adjusted in accordance with light emission wavelength ranges and the like of light sources that are respectively used for projection, it is possible to display clear color projected images with favorable light use efficiencies. Examples of the use aspects of members for displaying projected images include, particularly, the incidence angles of projected light on the surfaces of members for displaying projected images, the observation directions of projected images on the surfaces of members for displaying projected images, and the like.

The twisted directions (senses) of the helices of cholesteric liquid crystals in the two or more cholesteric liquid crystal layers having different central wavelengths of selective reflection which are included in the reflection member may be selected in accordance with the use.

During the lamination of multiple cholesteric liquid crystal layers, cholesteric liquid crystal layers that have been separately produced may be laminated together using adhesives or the like, or it is possible to directly apply a liquid crystal composition including polymerizable liquid crystal compounds onto the surface of a cholesteric liquid crystal layer that has been previously formed using a method described below and repeat a step of alignment and fixing, but the latter method is preferred. This is because, when the following cholesteric liquid crystal layer is directly formed on the surface of a previously-formed cholesteric liquid crystal layer, the alignment orientation of liquid crystal molecules on the air interface side of the previously-formed cholesteric liquid crystal layer and the alignment orientation of liquid crystal molecules on the lower side of a cholesteric liquid crystal layer formed thereon coincide with each other, and the polarization characteristics of the laminate of the cholesteric liquid crystal layers become favorable.

[Layer Formed of Composition Including Disc-Like Liquid Crystal Compound and Layer Formed of Composition Including Rod-Shaped Liquid Crystal Compound]

The reflection member of the present invention includes, as the cholesteric liquid crystal layers, a layer formed of a composition including a disc-like liquid crystal compound and a layer formed of a composition including a rod-shaped liquid crystal compound. Out of the two or more layers of fixed cholesteric liquid crystal phases, two layers closest to any one surface side of the reflection member preferably consist of a layer formed of a composition including a disc-like liquid crystal compound and a layer formed of a composition including a rod-like liquid crystal compound. In the reflection member, two cholesteric liquid crystal layers closest to the surface on the light incidence side are preferably a layer formed of a composition including a disc-like liquid crystal compound and a layer formed of a composition including a rod-like liquid crystal compound. The cholesteric liquid crystal layer closest to the surface on the light incidence side may be a layer formed of a composition including a disc-like liquid crystal compound or a layer formed of a composition including a rod-like liquid crystal compound.

The peak wavelength of selective reflection of the cholesteric liquid crystal layer shifts toward the short wavelength side of the peak wavelength (the central wavelength λ of selective reflection) of the front surface (in the normal direction to the layer). For example, for cholesteric liquid crystal layers in a wavelength range of 500 nm to 600 nm, there are cases in which the central wavelengths shift to a wavelength range of 400 nm to 500 nm in oblique orientations. In addition, cholesteric liquid crystal layers act as negative C plates (positive phase difference plates at Rth) in wavelength ranges in which selective reflection is not exhibited, and thus there are cases in which, in oblique orientations, the degree of circular polarization degrades due to the influence of retardation.

In the reflection member of the present invention, when a layer formed of a composition including a disc-like liquid crystal compound or a layer formed of a composition including a rod-like liquid crystal compound are used, it is considered that degradation of the degree of circular polarization due to the above-described cause is suppressed.

Between the layer formed of a composition including a disc-like liquid crystal compound and the layer formed of a composition including a rod-like liquid crystal compound which are included in the reflection member of the present invention, the difference in the absolute value of Rth (550) is preferably 100 nm or smaller and more preferably 50 nm or smaller. Particularly, between a layer formed of a composition including a disc-like liquid crystal compound and a layer formed of a composition including a rod-like liquid crystal compound which are adjacent to each other as the layers of fixed cholesteric liquid crystal phases, the difference in the absolute value of Rth (550) is preferably 100 nm or smaller and more preferably 50 nm or smaller. In addition, the signs of Rth (550) of the layer formed of a composition including a disc-like liquid crystal compound and the layer formed of a composition including a rod-like liquid crystal compound are more preferably opposite to each other. Furthermore, the sum of Rth (550) of the layer formed of a composition including a disc-like liquid crystal compound and the layer formed of a composition including a rod-like liquid crystal compound is preferably in a range of −100 nm to +100 nm, more preferably in a range of −80 nm to +80 nm, and particularly preferably in a range of −50 nm to +50 nm.

[Polymerizable Liquid Crystal Compound: Rod-Like Liquid Crystal Compound and Disc-Like Liquid Crystal Compound]

Examples of the rod-like liquid crystal compound forming the cholesteric liquid crystal layer include rod-like nematic liquid crystal compounds. As the rod-like nematic liquid crystal compounds, azomethines, azoxys, cyano biphenyls, cyanophenyl esters, benzoic acid esters, cyclohexane carboxylic acid phenyl esters, cyanophenyl cyclohexanes, cyano-substituted phenyl pyrimidines, alkoxy-substituted phenyl pyrimidines, phenyl dioxanes, tolans, and alkenyl cyclohexyl benzonitriles are preferably used. Not only low-molecular-weight liquid crystal compounds but also high-molecular-weight liquid crystal compounds can be used.

Examples of polymerizable rod-like liquid crystal compounds include compounds described in Makromol. Chem., Vol. 190, p. 2255 (1989), Advanced Materials Vol. 5, p. 107 (1993), the specification of U.S. Pat. No. 4,683,327A, the specification of U.S. Pat. No. 5,622,648A, the specification of U.S. Pat. No. 5,770,107A, WO95/22586A, WO95/24455A, WO97/00600A, WO98/23580A, WO98/52905A, JP1989-272551A (JP-H01-272551A), JP1994-16616A (JP-H06-16616A), JP1995-110469A (JP-H07-110469A), JP1999-80081A (JP-H11-80081A), JP2001-328973A, JP2001-64627, JP1999-513019A (JP-H11-513019A), and JP2007-279688A.

Methods for manufacturing light reflecting layers formed by fixing cholesteric liquid crystalline phases in which disc-like liquid crystal compounds are used as cholesteric liquid crystalline materials are not particularly limited, and, for example, methods described in JP2001-81465A, JP2007-108732A, and JP2010-244038A can be used. Examples of the disc-like liquid crystal compound include compounds described in "0020" to "0122" of JP2007-108732A or JP2010-244038A.

Hereinafter, preferred examples of the disc-like liquid crystal compound will be illustrated, but the present invention is not limited thereto.

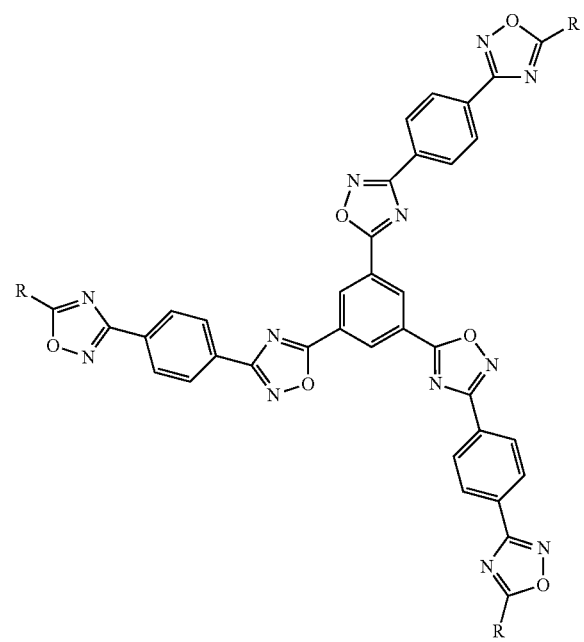

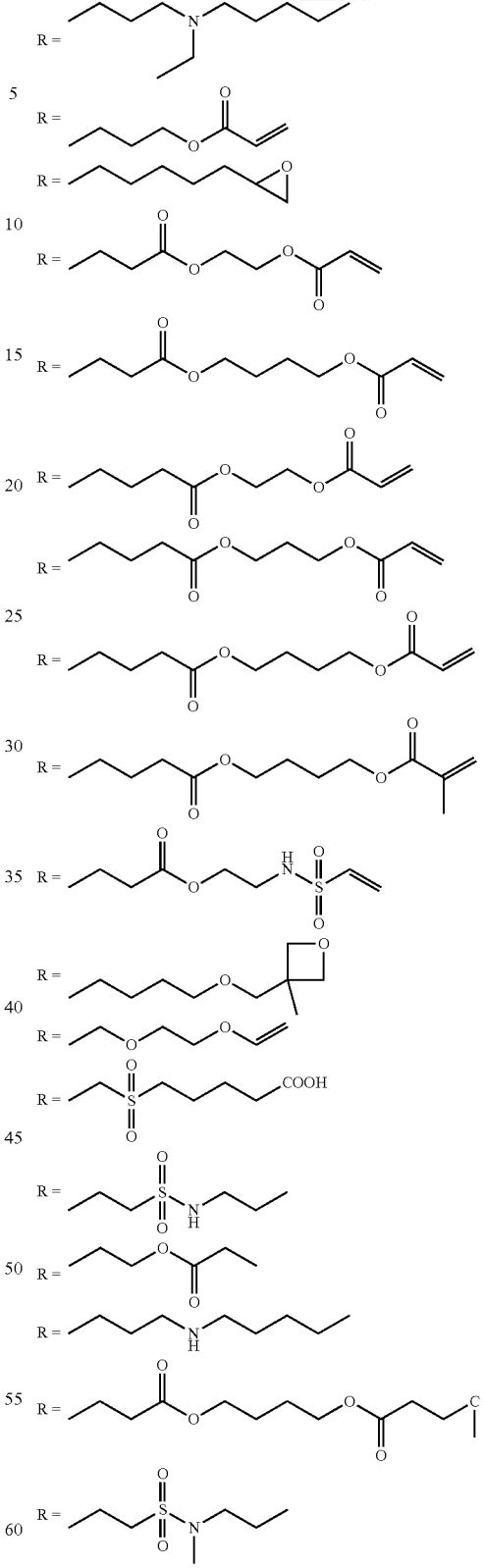

The polymerizable liquid crystal compound can be obtained by introducing polymerizable groups into liquid crystal compounds. Examples of polymerizable groups include unsaturated polymerizable groups, epoxy groups, and aziridinyl groups, unsaturated polymerizable groups are preferred, and ethylenic unsaturated polymerizable groups are particularly preferred. Polymerizable groups can be introduced into molecules of liquid crystal compounds using a variety of methods. The number of polymerizable groups in the polymerizable liquid crystal compound is preferably 1 to 6 and more preferably 1 to 3.

Two or more kinds of polymerizable liquid crystal compounds may be jointly used. When two or more kinds of polymerizable liquid crystal compounds are jointly used, it is possible to lower alignment temperatures.

In addition, the amount of the polymerizable liquid crystal compound added to the liquid crystal composition is preferably in a range of 80% by mass to 99.9% by mass, more preferably in a range of 85% by mass to 99.5% by mass, and particularly preferably in a range of 90% by mass to 99% by mass of the mass of the solid contents of the liquid crystal composition (the mass excluding solvents).

(Method for Producing Layer of Fixed Cholesteric Liquid Crystal Phase)

The cholesteric liquid crystal layer can be formed using liquid crystal compositions obtained by dissolving the above-described polymerizable liquid crystal compound and, furthermore, polymerization initiators, chiral agents, surfactants, and the like which are added as necessary in solvents. The cholesteric liquid crystal layer can be formed by applying a liquid crystal composition onto a support, an alignment layer, a previously-produced cholesteric liquid crystal layer, or the like and aligning, aging, and then fixing liquid crystals in a cholesteric manner. Liquid crystals can be fixed by polymerizing cholesteric liquid crystalline compositions by means of radiation of active rays on coated films. Meanwhile, laminate films consisting of multiple cholesteric liquid crystal layers can be formed by repeating manufacturing steps of cholesteric liquid crystal layers.

(Chiral Agent: Optical Active Compound)

Liquid crystal compositions for forming the cholesteric liquid crystal layer preferably include chiral agents. Chiral agents have a function of inducing the helix structures of cholesteric liquid crystalline phases. Chiral compounds may be selected according to the purpose since the senses of the helices or the helix pitches being induced varies depending on compounds.

The chiral agent is not particularly limited, and well-known compounds (for example, those described in p. 199, Chapter 3, Section 4-3 Chiral agents for TN and STN, Liquid Crystal Device Handbook, 142$^{nd}$ Committee of Japan Society for the Promotion of Science, 1989), isosorbide, and isomannide derivatives can be used.

Generally, chiral agents include asymmetric carbon atoms, but axially asymmetric compounds or planarly asymmetric compounds including no asymmetric carbon atoms can also be used as the chiral agent. Examples of the axially asymmetric compounds or the planarly asymmetric compounds include binaphthyl, helicene, paracyclophane, and derivatives thereof. The chiral agent may have polymerizable groups. In a case in which both the chiral agent and the liquid crystal compound have polymerizable groups, it is possible to form polymers having repeating units derived from the polymerizable liquid crystal compound and repeating units derived from the chiral agent by means of polymerization reactions between the polymerizable chiral agent and the polymerizable liquid crystal compound. In this aspect, polymerizable groups in the polymerizable chiral agent are preferably the same groups as polymerizable groups in the polymerizable liquid crystal compound. Therefore, polymerizable groups in the chiral agent are also preferably unsaturated polymerizable groups, epoxy groups, or aziridinyl groups, more preferably unsaturated polymerizable groups, and particularly preferably ethylenically unsaturated polymerizable groups.

In addition, the chiral agent may also be liquid crystal compounds.

In a case in which the chiral agent has photoisomerization groups, it is possible to form patterns having desired reflection wavelengths corresponding to light emission wavelengths by means of photomask irradiation with active light rays or the like after coating and alignment, which is preferable. The photoisomerization groups are preferably isomerization portions of compounds exhibiting photochromic properties, azo, azoxy, or cinnamoyl groups. As specific compounds, it is possible to use compounds described in JP2002-80478A, JP2002-80851A, JP2002-179668A, JP2002-179669A, JP2002-179670A, JP2002-179681A, JP2002-179682A, JP2002-180051A, JP2002-302487A, JP2002-338575A, JP2002-338668A, JP2003-313189A, and JP2003-313292A.

The content of the chiral agent in the liquid crystal composition is preferably in a range of 0.01% by mole to 200% by mole and more preferably in a range of 1% by mole to 30% by mole of the amount of the polymerizable liquid crystal compound.

(Polymerization Initiator)

The liquid crystal composition preferably includes polymerization initiators. In an aspect in which polymerization reactions are performed by means of ultraviolet irradiation, polymerization initiators being used are preferably photopolymerization initiators capable of initiating polymerization reactions by means of ultraviolet irradiation. Examples of the photopolymerization initiators include α-carbonyl compounds (described in the respective specifications of U.S. Pat. Nos. 2,367,661A and 2,367,670A), acyloin ethers (described in the specification of U.S. Pat. No. 2,448,828A), α-hydrocarbon-substituted aromatic acyloin compounds (the specification of U.S. Pat. No. 2,722,512A), polynuclear quinone compounds (described in the respective specifications of U.S. Pat. Nos. 3,046,127A and 2,951,758A), combinations of a triaryl imidazole dimer and p-amino phenyl ketone (described in the specification of U.S. Pat. No. 3,549,367A), acridine and phenazine compounds (described in JP1985-105667A (JP-S60-105667A) and the specification of U.S. Pat. No. 4,239,850A), oxadiazole compounds (described in the specification of U.S. Pat. No. 4,212,970A), and the like.

The content of the photopolymerization initiator in the liquid crystal composition is preferably in a range of 0.1% by mass to 20% by mass and more preferably in a range of 0.5% by mass to 5% by mass of the content of the polymerizable liquid crystal compound.

(Crosslinking Agent)

The liquid crystal composition may arbitrarily include crosslinking agents in order to improve film hardness after hardening and durability. As the crosslinking agent, agents that are hardened with ultraviolet rays, heat, moisture, or the like can be preferably used.

The crosslinking agent is not particularly limited and can be appropriately selected depending on the purpose. Examples thereof include polyfunctional acrylate compounds such as trimethylolpropane tri(meth)acrylate and pentaerythritol tri(meth)acrylate; epoxy compounds such as glycidyl (meth)acrylate and ethylene glycol diglycidyl ether; aziridine compounds such as 2,2-bishydroxymethyl butanol-tris[3-(1-aziridinyl)propionate] and 4,4-bis(ethylene imino carbonylamino) diphenylmethane; isocyanate compounds such as hexamethylene diisocyanate and biuret-type isocyanate; polyoxazoline compounds having an oxazoline group in a side chain; alkoxysilane compounds such as vinyltrimethoxysilane and N-(2-aminoethyl) 3-aminopropyl trimethoxysilane; and the like. In addition, well-known catalysts can be used in accordance with the reactivity of the crosslinking agent, and it is possible to improve not only the film hardness and the durability but also the productivity. The crosslinking agent may be used singly, or two or more crosslinking agents may be jointly used.

The content of the crosslinking agent is preferably in a range of 3% by mass to 20% by mass and more preferably in a range of 5% by mass to 15% by mass. When the content of the crosslinking agent is lower than 3% by mass, there are cases in which an effect of improving the crosslinking density cannot be obtained, and, when the content thereof exceeds 20% by mass, there are cases in which the stability of the cholesteric liquid crystal layer is degraded.

(Alignment Control Agent)

To the liquid crystal composition, alignment control agents that contribute to the stable and rapid provision of planar alignment to the cholesteric liquid crystal layer may be added. Examples of the alignment control agent include fluorine (meth)acrylate-based polymers described in Paragraphs "0018" to "0043" of JP2007-272185A, compounds represented by Formulae (I) to (IV) in Paragraphs "0031" to "0034" of JP2012-203237A, and the like.

Meanwhile, the alignment control agent may be used singly, or two or more alignment control agents may be jointly used.

The amount of the alignment control agent added to the liquid crystal composition is preferably in a range of 0.01% by mass to 10% by mass, more preferably in a range of 0.01% by mass to 5% by mass, and particularly preferably in a range of 0.02% by mass to 1% by mass of the total mass of the polymerizable liquid crystal composition.

(Other Additives)

Additionally, the liquid crystal composition may include at least one additive selected from a variety of additives such as surfactants for adjusting the surface tension of coated films and evening the film thickness and polymerizable monomers. In addition, to the liquid crystal composition, it is possible to further add polymerization inhibitors, antioxidants, ultraviolet absorbents, light stabilizers, color materials, metal oxide fine particles, and the like as necessary as long as the optical performance is not degraded.

(Solvent and the Like)

Solvents used to prepare the liquid crystal composition are not particularly limited and can be appropriately selected depending on the purpose, but organic solvents are preferably used.

The organic solvents are not particularly limited and can be appropriately selected depending on the purpose, and examples thereof include ketones, alkyl halides, amides, sulfoxides, heterocyclic compounds, hydrocarbons, esters, ethers, and the like. The organic solvent may be used singly, or two or more organic solvents may be jointly used. Among these, ketones are particularly preferred in a case in which the load on the environment is taken into account.

Methods for applying the liquid crystal composition onto base materials are not particularly limited and can be appropriately selected depending on the purpose, and examples thereof include wire bar coating methods, curtain coating methods, extrusion coating methods, direct gravure coating methods, reverse gravure coating methods, die-coating methods, spin coating methods, dip coating methods, spray coating methods, slide coating methods, and the like. In addition, it is also possible to transfer the liquid crystal composition that has been applied onto a separate support onto base materials. When the applied liquid crystal composition is heated, liquid crystal molecules are aligned. The heating temperature is preferably 200° C. or lower and more preferably 130° C. or lower. By means of this alignment treatment, optical thin films in which the polymerizable liquid crystal compound is twist-aligned so as to have helix axes in a direction that is substantially perpendicular to the film surface can be obtained.

The aligned liquid crystal compound may be further polymerized. Polymerization may be any of thermal polymerization and photopolymerization by means of light irradiation, but photopolymerization is preferred. In light irradiation, ultraviolet rays are preferably used. The irradiation energy is preferably in a range of 20 mJ/cm$^2$ to 50 J/cm$^2$ and more preferably in a range of 100 mJ/cm$^2$ to 1,500 J/cm$^2$. In order to accelerate the photopolymerization reaction, light irradiation may be carried out under heating conditions or in nitrogen atmospheres. The wavelengths of ultraviolet rays during irradiation are preferably in a range of 350 nm to 430 nm. The polymerization reaction percentage is preferably higher from the viewpoint of stability, and is preferably 70% or higher and more preferably 80% or higher. Regarding the polymerization reaction percentage, the consumption proportion of polymerizable functional groups can be determined using an IR absorption spectrum.

Meanwhile, the film thickness of the cholesteric liquid crystal layer needs to be in a range of 0.5 μm to 20 μm and is preferably in a range of 1 μm to 12 μm and more preferably in a range of 1.5 μm to 7 μm.

(Support)

The reflection member may include supports. Supports are not particularly limited. Supports used to form the cholesteric liquid crystal layer may be temporary supports that are peeled off after the formation of the cholesteric liquid crystal layer. In a case in which the support is a temporary support, the temporary support does not serve as layers that constitute a member for displaying projected images, and thus there is no particular limitation regarding optical characteristics such as transparency or refraction properties. As the support (temporary support), in addition to plastic films, glass or the like may be used. Examples of plastic films include polyesters such as polyethylene terephthalate (PET), polycarbonate, acrylic resins, epoxy resins, polyurethane, polyamide, polyolefin, cellulose derivatives, silicone, and the like.

The film thickness of the support needs to be in a range of approximately 5 μm to 1,000 μm and is preferably in a range of 10 μm to 250 μm and more preferably in a range of 15 μm to 90 μm.

(Alignment Film)

The reflection member may include alignment films. The alignment films can be provided using means such as rubbing treatments of organic compounds or polymers (resins such as polyimide, polyvinyl alcohol, polyester, polyarylate, polyamideimide, polyetherimide, polyamide, or modified polyamide), the oblique evaporation of inorganic compounds, the formation of layers having microgrooves, or the accumulation of organic compounds (for example, ω-tricosanoic acid, dioctadecylmethylammonium chloride, or methyl stearate) using the Langmuir-Blodgett method (LB film). Furthermore, alignment films exhibiting an alignment function when put in an electric field or a magnetic field or irradiated with light are also known.

Particularly, for alignment films made of polymers, it is preferable to apply compositions for forming liquid crystal layers onto a rubbed surface of the film after rubbing treatments. Alignment films being formed are particularly preferred. The rubbing treatments can be carried out by rubbing the surfaces of polymer layers in a single direction with paper or fabrics several times.

The liquid crystal composition may be applied to the surface of the support or the rubbed surface of the support without providing the alignment film.

In a case in which the support is a temporary support, the alignment layer may be peeled off together with the temporary support and thus not constitute the member for displaying projected images of the present invention.

The thickness of the alignment layer is preferably in a range of 0.01 μm to 5 μm and more preferably in a range of 0.05 μm to 2 μm.

(Antireflection Layer)

The reflection member may include antireflection layers. For example, in a case in which the reflection member is used as a member for displaying projected images, the antireflection layer may be provided on a surface (the outermost surface) on the viewing side when seen from the cholesteric liquid crystal layer or may be provided on a surface which is a surface of a base material described below and a surface opposite to the surface provided with the cholesteric liquid crystal layer.

The antireflection layer is not particularly limited as long as the antireflection layer has sufficient durability and heat resistance in a practical sense and is capable of suppressing reflectivity with respect to, for example, 60-degree incidence to 5% or lower and can be appropriately selected according to the purpose, and examples thereof include films having fine unevenness formed on the surfaces, bilayer films constituted by combining a layer of a high refractive index and a layer of a low refractive index, trilayer films constituted by sequentially laminating a layer of an intermediate refractive index, a layer of a high refractive index, and a layer of a low refractive index, and the like.

Examples of the constitution include constitutions of two layers of a layer of a high refractive index/a layer of a low refractive index from the lower side, constitutions of three layers having different refractive indexes in which a layer of an intermediate refractive index (a layer having a refractive index that is higher than that of the underlayer and is lower than that of a layer of a high refractive index)/the layer of a high refractive index/a layer of a low refractive index are sequentially laminated, and the like, and constitutions in which a larger number of antireflection layers are laminated are also proposed. Among these, from the viewpoint of durability, optical characteristics, costs, productivity, and the like, constitutions in which a layer of an intermediate refractive index/a layer of a high refractive index/a layer of a low refractive index on a hardcoat layer are preferred, and examples thereof include constitutions described in JP1996-122504A (JP-H08-122504A), JP1996-110401A (JP-H08-110401A), JP1998-300902A (JP-H10-300902A), JP2002-243906A, JP2000-111706A, and the like. In addition, antireflection films having three-layer constitutions with excellent robustness with respect to changes in film thicknesses are described in JP2008-262187A. In addition, individual layers may be imparted with other functions, and examples thereof include constitutions made to serve as antifouling layers of a low refractive index, antistatic layers of a high refractive index, antistatic hardcoat layers, and anti-glare layers of a low refractive index (for example, JP1998-206603A (JP-H10-206603A), JP2002-243906A, JP2007-264113A, and the like).

The refractive index of layers of a high refractive index is preferably in a range of 1.65 to 2.20 and more preferably in a range of 1.70 to 1.80. The refractive index of layers of an intermediate refractive index is adjusted so as to be a value between the refractive index of layers of a low refractive index and layers of a high refractive index. The refractive index of layers of an intermediate refractive index is preferably in a range of 1.55 to 1.65 and more preferably in a range of 1.58 to 1.63.

The film thickness of the antireflection layer is not particularly limited and may be approximately in a range of 0.1 μm to 10 μm, a range of 1 μm to 5 μm, and a range of 2 μm to 4 μm.

(Base Material)

The reflection member may include base materials. In the present specification, base materials refer to layers provided to maintain the shapes of the cholesteric liquid crystal layer and may be the same as supports used to form the cholesteric liquid crystal layer or may be base materials provided separately from supports.

In a case in which the reflection member is used as a half-mirror for displaying projected images, the base material is preferably transparent in the visible light range.

The reflection member may or may not include base materials, and, for example, when the reflection member is attached to at least part of other articles such as front windows of vehicles, at least part of the articles may function as base materials.

As the base material, it is possible to use the same material as those listed as examples of the support. In addition, the film thickness of the base material may be the same as the film thickness of the support and may be thicker than 1,000 μm or 10 mm or thicker. In addition, the film thickness may be 200 mm or thinner, 100 mm or thinner, 80 mm or thinner, 60 mm or thinner, 50 mm or thinner, 40 mm or thinner, 30 mm or thinner, 20 mm or thinner, or the like.

In members for displaying projected images, the cholesteric liquid crystal layer may be provided on one surface of the base material, and the cholesteric liquid crystal layer is preferably not provided on the other surface.

As the base material, a base material of low birefringence properties is preferably used, and it is also preferable to use, for example, a base material having Re (550) of 50 nm or less and more preferable to use a base material having Re (550) of 20 nm or less. This is because, when a base material of low birefringence properties is used, there are cases in which the antireflection layer becomes unnecessary. Examples of the base material of low birefringence properties that is transparent in the visible light range include inorganic glass and polymer resins. As polymer resins of low birefringence properties, it is possible to use organic materials of low birefringence properties that are used in optical disc substrates, pickup lenses, lenses for cameras, microscopes, and video cameras, substrates for liquid crystal displays, prisms, optical interconnection components, optical fibers, light guide plates for liquid crystal displays, lenses for laser beam printers, projectors, and facsimiles, Fresnel lenses, contact lenses, polarizing plate protective films, microlens arrays, and the like in which birefringence hinders formation of images or acts as the origin of signal noises in the same manner.

Specific examples of polymer resin materials that can be used as the base material include acrylic resins (acrylic acid esters and the like of polymethyl (meth)acrylates and the like), polycarbonate, cyclic polyolefins such as cyclopentadiene-based polyolefins and norbornene-based polyolefins, polyolefins such as polypropylene, aromatic vinyl polymers such as polystyrene, polyacrylates, and cellulose acylates.

(Adhesive Layer)

Adhesive layers may be layers formed of adhesives.

As adhesives, from the viewpoint of hardening methods, there are melt-type adhesives, thermal hardening-type adhesives, light hardening-type adhesives, reaction hardening-type adhesives, pressure sensitive-type adhesive for which hardening is not required, and, as materials for the respective adhesives, acrylate-based compounds, urethane-based compounds, urethane acrylate-based compounds, epoxy-based compounds, epoxy acrylate-based compounds, polyolefin-based compounds, modified olefin-based compounds, polypropylene-based compounds, ethylene vinyl alcohol-based compounds, vinyl chloride-based compounds, chloroprene rubber-based compounds, cyanoacrylate-based compounds, polyamide-based compounds, polyimide-based compounds, polystyrene-based compounds, polyvinyl butyral-based compounds, and the like can be used. From the viewpoint of workability and productivity, the hardening method is preferably light hardening-type methods, and, from the viewpoint of optical transparency and heat resistance, as materials, acrylate-based materials, urethane acrylate-based materials, epoxy acrylate-based materials, and the like are preferably used.

The film thickness of the adhesive layer may be in a range of 0.5 µm to 10 µm and preferably in a range of 1 µm to 5 µm. The adhesive layer is preferably provided in a uniform film thickness in order to mitigate color unevenness and the like.

<Use of Reflection Member>

The reflection member of the present invention can be used in, for example, members for displaying projected images and heat shield members.

In addition, the reflection member of the present invention can be used as dichromic mirrors in spectral devices, liquid crystal display devices, liquid crystal projectors, and fluorescent microscopes.

[Member for Displaying Projected Images]

In the present specification, members for displaying projected images may be any members capable of displaying projected images using reflected light or transmitted light or any members capable of visibly displaying projected images projected from projectors and the like. Examples of members for displaying projected images include projection screens, half-mirrors for displaying projected images, and the like.

In members for displaying projected images, two cholesteric liquid crystal layers closest to a surface on the light incidence side and on the projected image display side are preferably a layer formed of a composition including a disc-like liquid crystal compound and a layer formed of a composition including a rod-like liquid crystal compound. The cholesteric liquid crystal layer closest to a surface on the light incidence side and on the projected image display side may be a layer formed of a composition including a disc-like liquid crystal compound or a layer formed of a composition including a rod-like liquid crystal compound.

[Projection Screen]

In a case in which the reflection member is used as a projection screen that displays real images on the member, in order to form real images on the screen, the screen preferably scatters and reflects projected light wavelengths. This scattering and reflection performance can be imparted using methods in which diffusion layers formed by mixing fine particles into a binder and the like and applying the mixture to a transparent medium are formed on the light incidence side of screens or methods in which the uniformity of the alignment of cholesteric liquid crystal layers is disarranged. When the amount of light scattered is small, the view angle becomes narrow, and, conversely, when the amount of light scattered is too great, the display contrast degrades due to the scattering of peripheral light. Therefore, the haze value measured from any one surface of the reflection member is preferably in a range of 2.0% to 30%. When the haze value is 2.0% or higher, the diffusion and reflection of light on the surface of the reflection member becomes possible, and projected images can be displayed at wide view angles. In addition, when the haze value is 30% or lower, it becomes possible to suppress the contrast of displayed images being degraded due to peripheral light. The haze value is more preferably in a range of 3.0% to 25% and still more preferably in a range of 4.0% to 20%.

Meanwhile, in the present specification, haze values refer to values measured as haze values with respect to C light sources using NDH-2000 manufactured by Nippon Denshoku Industries Co., Ltd.

[Half-Mirror for Displaying Projected Images]

Half-mirrors for displaying projected images refer to optical members capable of visibly displaying projected images and capable of observing information or landscapes present on the opposite surface side of half-mirrors for displaying projected images at the same time from the same surface side on which images are displayed. That is, half-mirrors for displaying projected images are capable of performing functions as light path combiners that display external light and projected light in a well-harmonized manner.

Specific examples of use as half-mirrors for displaying projected images include planar mirrors, concave mirrors, convex mirrors, and the like for forming virtual images using a variety of projectors such as reflection mirrors, reflection screens for see-through displays, and reflection mirrors or dichroic mirrors for head mounted displays which are used in combiners in head up displays (HUDs) or projection devices. Regarding use as combiners in head up displays, JP2013-79930A and WO2005/124431A can be referred to.

Examples of specific constitutions of a case in which the reflection member of the present invention is used in half-mirrors for displaying projected images include constitutions in which two or more layers of fixed cholesteric liquid crystal phases and a base material are provided in this order and antireflection layers are provided on the surfaces of any one or both of the layers;

constitutions in which a base material of low birefringence properties, two or more layers of fixed cholesteric liquid crystal phases, and an antireflection layer are provided in this order;

constitutions in which two or more layers of fixed cholesteric liquid crystal phases, a base material, and an antireflection layer are provided in this order; and the like.

In a case in which the reflection member is used as a half-mirror for displaying projected images, the haze value measured from any one surface of the reflection member, particularly, the surface on the projected image display side is preferably lower than 2.0%.

(Projection System)

The reflection member is capable of forming projection systems for displaying projected images together with projectors for projecting linearly polarized light and wavelength plates for converting linearly polarized light to circularly polarized light.

Projected images may be any images which are based on not peripheral landscapes but projection of light from projectors being used. Projected images may be any multicolor or colorful images. Projected images may be images that are displayed on the surfaces of members for displaying projected images and are recognized as being displayed on the surfaces or may be virtual images that appear in a buoyant state ahead of reflection members to observers. In a case in which reflection members are half-mirrors, projected images may be displayed as the above-described virtual images.

In projection systems, projectors, wavelength plates for converting linearly polarized light to circularly polarized light, and members for displaying projected images are preferably disposed in this order. Wavelength plates may be integrated with projectors, may be integrated with members for displaying projected images, or may be separated from projectors and members for displaying projected images.

In projection systems, wavelength plates are installed at angles at which the slow axis direction is adjusted in accordance with the polarization direction of projected light from projectors and thus outgoing light is circularly polarized. Furthermore, wavelength plates are disposed so that the sense of circular polarization of projected light with individual wavelengths which have passed through the wavelength plates matches the selective reflection characteristics of circular polarization of members for displaying projected images.

(Wavelength Plate that Converts Linearly Polarized Light to Circularly Polarized Light)

Examples of the wavelength plate that converts linearly polarized light to circularly polarized light include phase difference plates functioning as ¼ wavelength plates. Examples the ¼ wavelength plates include monolayer-type ¼ wavelength phase difference plates, broadband ¼ wavelength phase difference plates obtained by laminating a ¼ wavelength phase difference plate and a ½ wavelength phase difference plate, and the like.

The front surface phase difference of the former λ/4 wavelength phase difference plate needs to be a length that is ¼ of the wavelength of projected light. Therefore, in a case in which the central wavelength of projected light is, for example, 450 nm, 530 nm, or 640 nm, a reverse dispersive phase difference plate having a phase difference that is 112.5 nm±10 nm, preferably 112.5 nm±5 nm, and more preferably 112.5 nm at a wavelength of 450 nm, is 132.5 nm±10 nm, preferably 132.5 nm±5 nm, and more preferably 132.5 nm at a wavelength of 530 nm, or is 160 nm±10 nm, preferably 160 nm±5 nm, and more preferably 160 nm at a wavelength of 640 nm is most preferred as the λ/4 wavelength phase difference plate, but it is also possible to use a phase difference plate in which the wavelength dispersiveness of the phase difference is small or a dispersive phase difference plate. Meanwhile, "being reverse dispersive" refers to a property in which the absolute value of the phase difference increases as the wavelength increases, and "being dispersive" refers to a property in which the absolute value of the phase difference increases as the wavelength decreases.

The latter lamination-type ¼ wavelength phase difference plate is a plate that converts linearly polarized light to circularly polarized light in a manner in which the ¼ wavelength phase difference plate and the ½ wavelength phase difference plate are attached together so that the slow axes thereof form an angle of approximately 60 degrees, the ½ wavelength phase difference plate is disposed on the incidence side of linearly polarized light, and the slow axis of the ½ wavelength phase difference plate is intersected at 15 degrees or 75 degrees with respect to the polarization surface of the incident linearly polarized light, and the ¼ wavelength phase difference layer can be preferably used due to its favorable reverse dispersiveness of phase difference.

Meanwhile, the phase difference can be measured using a polarization phase difference analyzer AxoScan manufactured by AXOMETRICS, Inc. Alternatively, the phase difference may be measured by entering light having a wavelength of λ nm in the film normal direction in KOBRA 21ADH or WR (manufactured by Oji Scientific Instruments).

As the λ/4 wavelength phase difference plate, a commercially available product in which a birefringence material such as quartz is used may be used or the λ/4 wavelength phase difference layer can be formed by arranging and fixing a polymerizable liquid crystal compound and a high-molecular-weight liquid crystal compound. The kind of the liquid crystalline compound that is used for this formation is not particularly limited. For example, it is also possible to use an optically anisotropic layer obtained by forming a low-molecular-weight liquid crystalline compound in a nematic alignment in a liquid crystal state, then, forming an optically anisotropic layer obtained by fixing the liquid crystal compound by means of light crosslinking or thermal crosslinking or a high-molecular-weight liquid crystalline compound in a nematic alignment in a liquid crystal state, and then fixing the alignment by means of cooling.

(Projector)

As projectors when the reflection member of the present invention is used as a member for displaying projected images, projectors capable of projecting linearly polarized light are preferably used. Projectors need to project linearly polarized light in terms of the principle of projected image formation. Projectors may be projectors only projecting linearly polarized light or projectors projecting natural light or light in other polarization states together with linearly polarized light. In the present specification, "projectors" refer to "devices that project light or images", and "any devices that project drawn images to members for displaying projected images" can be considered as projectors. In the present specification, in some cases, separately from members for displaying projected images, screens that display images drawn using projectors will be referred to as "intermediate image screens". Projectors may, for example, enlarge and project images drawn on small-size intermediate image screens to members for displaying projected images.

Projectors are not particularly limited as long as the projectors have a function of projecting images. Examples of projectors include, particularly, projectors having a constitution in which light is polarized and isolated for each color using polarization beam splitters or the like. Specific examples thereof include liquid crystal projectors, liquid crystal on silicon (LCOS) projectors, cathode ray tube (CRT) projectors, and the like.

In projection systems, the twisted directions of the cholesteric liquid crystal layer need to be adjusted in accordance with the polarization directions of outgoing light from projectors.

As light sources in projectors, laser light sources, LEDs, discharge tubes, and the like can be used.

(Intermediate Image Screen)

Projection systems may include intermediate image screens. Images may be drawn on intermediate image screens. Intermediate image screens may be disposed between projectors and members for displaying projected images or may be disposed between wavelength plates that convert linearly polarized light to circularly polarized light such as λ/4 wavelength phase difference plates and members for displaying projected images. Intermediate image screens may serve as constituent members of projectors or may be independently disposed between projectors and members for displaying projected images.

Examples of intermediate image screens include scattering films, microlens arrays, screens for rear projection, and the like. In a case in which plastic materials are used as intermediate image screens, when the intermediate image screens have birefringence properties, the polarization surfaces or intensities of polarized light incident on the intermediate image screens are disarranged, and, in members for displaying projected images, a possibility of the generation of color unevenness and the like increases; however, when phase difference films having a predetermined phase difference are used, the problem of color unevenness can be reduced.

Intermediate image screens are preferably screens which have a function of broadening and transmitting incidence light rays and thus are capable of enlarging and displaying the view angles of projected images in members for displaying projected images. Examples thereof include screens constituted of microlens arrays. Microlens arrays used in head up displays are described in, for example, JP2012-226303A, JP2010-145745A, and JP2007-523369A.

[Heat Shield Member]

The reflection member of the present invention can also be used as a heat shield member. For example, the reflection member is capable of functioning as heat shield members by, for example, reflecting light in a variety of wavelength ranges such as the infrared range, the visible light range, and the ultraviolet range of sunlight that can be made incident at a variety of angles.

Particularly, in use aspects requiring wavelength selectivity, the reflection member of the present invention can be preferably used as a heat shield member in projectors and can be preferably used as a member for shielding heat for optical systems by selectively reflecting visible light in projectors including optical systems that project linearly polarized light. That is, when all visible light is shielded, the projected image display function of projectors is impaired; however, when a reflection member exhibiting selective reflection at wavelengths corresponding to the wavelengths of linearly polarized light being projected is used in combination with a ¼ wavelength phase difference plate, it is possible to transmit light with wavelengths and in polarization states which are required for projection and reflect other light. Therefore, it is possible to shield optical systems in projectors from visible light of external light without reducing projected light.

In the present specification, optical systems in projectors refer to portion including drawing devices such as light sources and light modulators and refer to, for example, in ordinary projectors, a minimum range of constitutions necessary to emit projected light for forming projected images excluding additional members such as housings. Optical systems are not particularly limited as long as the optical systems have a function of projecting images. Examples of light sources in optical systems include laser light sources, LEDs, discharge tubes, and the like. In addition, examples of drawing devices in optical systems include liquid crystal panels, digital micromirror devices (DMD), grating light valves (GLV), liquid crystal on silicon (LCOS), microelectromechanical systems (MEMS), and the like.

In a case in which the reflection member of the present invention is provided in a projector including an optical system that projects linearly polarized light or is used in combination with a projector including an optical system that projects linearly polarized light, it is necessary to adjust the twisted direction of the cholesteric liquid crystal layer in accordance with the polarization directions of individual wavelengths of projected light from the optical system.

Projectors to which the reflection member of the present invention is applied as a heat shield member are not particularly limited, but preferred examples thereof include projectors used in head up displays. This is because head up display devices particularly require heat shield properties when used in vehicles that are easily affected by the heat of sunlight.

In projectors for head up displays, the reflection member needs to be provided on the optical system side of a projected image display portion in the sunlight incidence direction with respect to an optical system. The above-described constitution transmits projected light from the optical system through the reflection member and shields external light travelling toward the optical system.

FIG. 1 illustrates a schematic sectional view of an example of a projector for head up displays. In the drawing, reference number 11 indicates a light source, reference number 12 indicates a drawing device, reference number 14 indicates a housing, reference number 15 indicates a window portion for extracting light derived from an optical system outside the housing, and reference number 13 indicates a mirror reflector that reflects projected light from the optical system in a window portion direction. In the projector for head up displays illustrated in FIG. 1, projected light from the optical system is reflected at the mirror reflector 13, passes through the window portion 15, and displays projected images on a projected image display member present at the upper portion of the window portion 15 in FIG. 1. The window portion 15, in some cases, is a curved surface as illustrated in the drawing so as to prevent reflected images of the window portion 15 from appearing on front windows of vehicles. External light such as sunlight comes inside the projector through the window portion 15; however, when the reflection member of the present invention including a ¼ wavelength phase difference plate is provided on any surface of the window portion 15, some of visible light is reflected, and thus the optical system can obtain constitutions in which visible light is shielded. At this time, the reflection member of the present invention also preferably includes infrared light shield layers.

EXAMPLES

Hereinafter, the present invention will be described more specifically using examples. Materials, reagents, the amounts and proportions of substances, operations, and the like described in the following examples can be appropriately modified within the scope of the gist of the present invention. Therefore, the scope of the present invention is not limited to the following examples.

<Production of R1 to R3 Layers>

A coating fluid R-1 shown in Table 1 was applied onto a rubbed surface of PET manufactured by Fujifilm Corporation which had been subjected to a rubbing treatment using a wire bar at room temperature so that the thickness of the dried film after drying reached 3.5 μm. The coated layer was dried at room temperature for 30 seconds, then, was heated for two minutes in an atmosphere at 85° C., and then was irradiated with UV at 30° C. for 12 seconds using a D valve (lamp: 90 mW/cm) manufactured by Fusion at an output of 60%, thereby obtaining an R-1 layer on the PET film.

Similarly, coating fluids R-2 and R-3 shown in Table 1 were applied onto rubbed surfaces of PETs manufactured by Fujifilm Corporation which had been subjected to a rubbing treatment using a wire bar at room temperature so that the thicknesses of the dried films after drying reached the thicknesses shown in Table 2, and UV irradiation was carried out in the same manner as in the formation of the R-1 layer, thereby producing an R-2 layer and an R-3 layer on the PET film respectively.

<Production of RS1 to RS3 Layers>

RS1 layer to RS3 layer were formed in the same manner as in the production of the R1 to R3 layers except for the fact that PET which had not been subjected to a rubbing treatment was used.

<Production of D1 to D3 Layers>

A polyimide alignment film manufactured by Nissan Chemical Industries, Ltd. was formed on a 1.1 mm-thick glass plate and was subjected to a rubbing treatment. A coating fluid D-1 shown in Table 1 was applied onto the rubbed surface using a wire bar at room temperature so that the thickness of the dried film after drying reached 3.5 µm. The coated layer was dried at room temperature for 30 seconds, then, was heated for two minutes in an atmosphere at 85° C., and then was irradiated with UV at 30° C. for 12 seconds using a D valve (lamp: 90 mW/cm) manufactured by Fusion at an output of 60%, thereby obtaining an D1 layer on the PET film.

Similarly, polyimide alignment films manufactured by Nissan Chemical Industries, Ltd. were formed on 1.1 mm-thick glass plates and were subjected to a rubbing treatment. Coating fluids D-2 and D-3 shown in Table 1 were applied onto the rubbed surfaces using a wire bar at room temperature so that the thicknesses of the dried films after drying reached the thicknesses shown in Table 2, and UV irradiation was carried out in the same manner as in the formation of the D1 layer, thereby producing a D2 layer and a D3 layer respectively.

<Production of DS1 to DS3 Layers>

DS1 to DS3 layers were formed in the same manner as in the production of the D1 to R3 layers except for the fact that polyimide alignment films manufactured by Nissan Chemical Industries, Ltd. were used on 1.1 mm-thick glass plates which were not subjected to a rubbing treatment.

TABLE 1

| Material (kind) | Material name (maker) | Coating fluid R-1 | Coating fluid R-2 | Coating fluid R-3 |
|---|---|---|---|---|
| Liquid crystal compound | Compound 1 | 100 parts by mass | 100 parts by mass | 100 parts by mass |
| Polymerization initiator | Irg-819 (BASF) | 4 parts by mass | 4 parts by mass | 4 parts by mass |
| Alignment control agent | Compound 2 | 0.03 parts by mass | 0.03 parts by mass | 0.03 parts by mass |
| Chiral agent | LC-756 (BASF) | 4.4 parts by mass | 5.4 parts by mass | 6.4 parts by mass |
| Solvent | 2-Butanone (Wako Pure Chemical Industries Ltd.) | Appropriately adjusted in accordance with the film thickness | Appropriately adjusted in accordance with the film thickness | Appropriately adjusted in accordance with the film thickness |

| Material (kind) | Material name (maker) | Coating fluid D-1 | Coating fluid D-2 | Coating fluid D-3 |
|---|---|---|---|---|
| Liquid crystal compound | Compound 3 | 100 parts by mass | 100 parts by mass | 100 parts by mass |
| Polymerization initiator | Irg-819 (BASF) | 4 parts by mass | 4 parts by mass | 4 parts by mass |
| Chiral agent | Compound 4 | 4.1 parts by mass | 5.0 parts by mass | 5.9 parts by mass |
| Solvent | 2-Butanone (Wako Pure Chemical Industries Ltd.) | Appropriately adjusted in accordance with the film thickness | Appropriately adjusted in accordance with the film thickness | Appropriately adjusted in accordance with the film thickness |

Compound 1

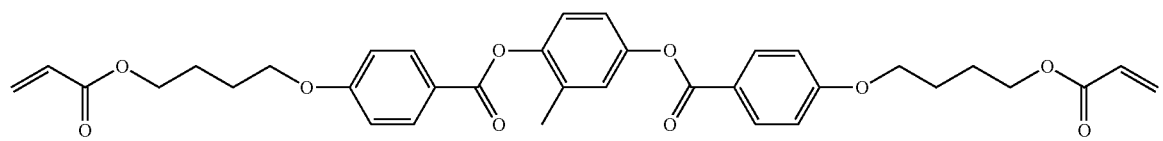

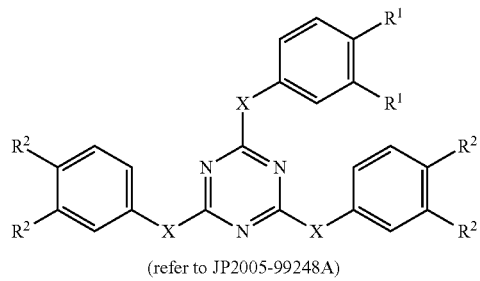

(refer to JP2005-99248A)

| R¹ | R² | X |
|---|---|---|
| O(CH$_2$)$_2$O(CH$_2$)$_2$(CF$_2$)$_6$F | O(CH$_2$)$_2$O(CH$_2$)$_2$(CF$_2$)$_6$F | NH |

<Confirmation of Optical Characteristics>

The central wavelengths of reflection peaks of these cholesteric liquid crystal layers with respect to vertical incidence rays were measured using AxoScan manufactured by AXOMETRICS, Inc. In addition, Rth's of the respective Compound 2

Compound 3

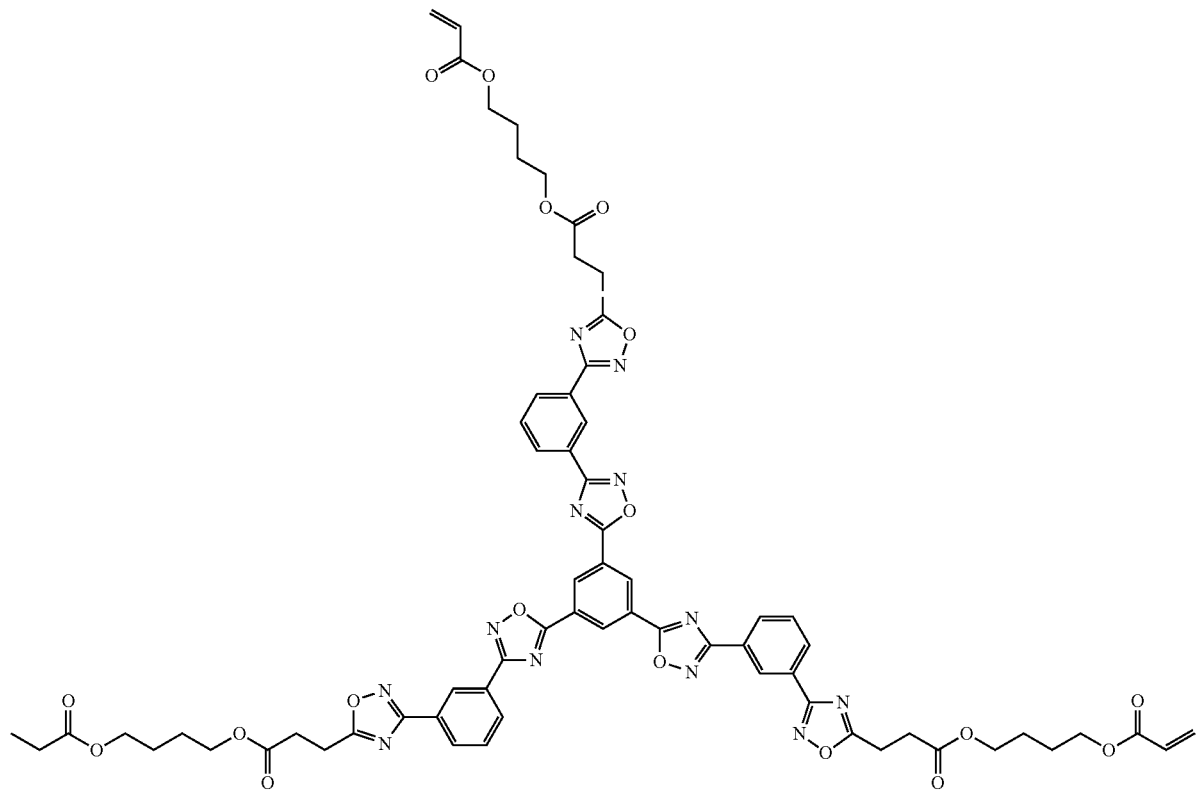

Compound 4

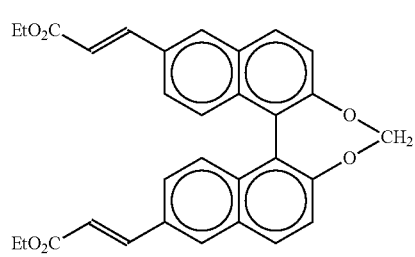

layers were measured using the ellipso measurement method described in M. Kimura et al. Jpn. J. Appl. Phys. 48 (2009) 03B021. The results are shown in Table 2.

<Formation of Reflection Member 1 of Layer Constitution (1)>

[Formation of reflection member 1 of Example 1]

A hardcoat coating fluid having the following composition, prepared at a concentration of solid contents of 50% by mass, was applied onto one surface of a 40 μm-thick cellulose acylate film (FUJITAC TD-40 manufactured by Fujifilm Corporation) using a gravure coater, and was irradiated with ultraviolet rays at 50 mJ/cm² using a UV lamp having an illuminance of 100 mW/cm² in a nitrogen atmosphere so as to be half-cured, thereby forming a hardcoat layer having a thickness of 3.0 μm and a refractive index of 1.52.

(Hardcoat Coating Fluid)

| | |
|---|---|
| Quaternary ammonium salt compound (antistatic copolymer A-1 obtained in the same manner as in Synthesis Example 1 of JP4600605B) | 15% by mass |
| Pentaerythritol tetraacrylate (manufactured by Shin-Nakamura Chemical Co., Ltd.) | 82% by mass |
| Photopolymerization initiator (IRGACURE 184 manufactured by BASF) | 3% by mass |
| Levelling agent B1 | 0.1% by mass |
| Solvent MEK/methyl acetate = mass ratio of 40/60 | |

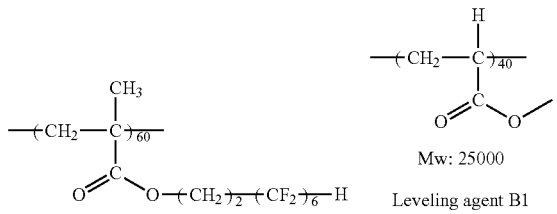

Mw: 25000

Leveling agent B1

A coating fluid for a layer of an intermediate refractive index C1 having the following composition was prepared and was filtered using a polypropylene filter having a pore diameter of 0.4 μm, thereby obtaining a coating fluid C1. This coating fluid was applied onto the hardcoat layer using a gravure coater. The drying conditions were set to 90° C. and 60 seconds, and the coating fluid was irradiated with ultraviolet rays at an irradiation amount of 60 mJ/cm² using a UV lamp having an illuminance of 100 mW/cm² in a nitrogen atmosphere so as to be half-cured, thereby forming a layer of an intermediate refractive index having a thickness of 0.06 μm and a refractive index of 1.594.

(Coating Fluid for Layer of Intermediate Refractive Index C1)

| | |
|---|---|
| ZrO₂ fine particle MEK dispersion liquid (NANOUSE OZ-S30K, concentration of solid contents of 30% by mass, manufactured by Nissan Chemical Industries, Ltd.) | 6.67 parts by mass |
| Pentaerythritol tetraacrylate (manufactured by Shin-Nakamura Chemical Co., Ltd.) | 2.86 parts by mass |
| Levelling agent B2 (concentration of solid contents of 30% by mass, MEK solvent) | 0.17 parts by mass |
| Photopolymerization initiator (IRGACURE 907 manufactured by BASF) | 0.09 parts by mass |

-continued

| | |
|---|---|
| MEK | 62 parts by mass |
| Methyl isobutyl ketone | 10 parts by mass |
| Cyclohexanone | 19 parts by mass |

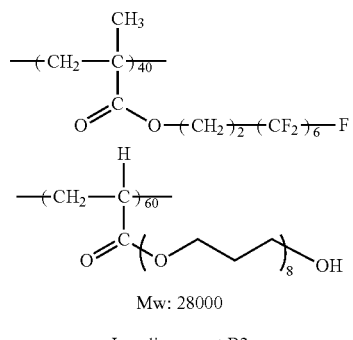

Mw: 28000

Leveling agent B2

In the formula, 40:60 indicates the mass ratio.

A coating fluid for a layer of a high refractive index C2 having the following composition was prepared and was filtered using a polypropylene filter having a pore diameter of 0.4 μm, thereby obtaining a coating fluid C2. This coating fluid was applied onto the layer of an intermediate refractive index using a gravure coater. The drying conditions were set to 90° C. and 60 seconds, and the coating fluid was irradiated with ultraviolet rays at an irradiation amount of 60 mJ/cm² using a UV lamp having an illuminance of 100 mW/cm² in a nitrogen atmosphere so as to be half-cured, thereby forming a layer of an intermediate refractive index having a thickness of 0.13 μm and a refractive index of 1.708.

(Coating Fluid for Layer of High Refractive Index C2)

| | |
|---|---|
| ZrO₂ fine particle-containing hardcoat agent (OPSTAR KZ6666, concentration of solid contents of 50% by mass, manufactured by JSR Corporation) | 14.10 parts by mass |
| Pentaerythritol tetraacrylate (manufactured by Shin-Nakamura Chemical Co., Ltd.) | 0.41 parts by mass |
| Levelling agent B2 (concentration of solid contents of 30% by mass, MEK solvent) | 0.11 parts by mass |
| Photopolymerization initiator (IRGACURE 907 manufactured by BASF) | 0.01 parts by mass |
| MEK | 49 parts by mass |
| Cyclohexanone | 36.5 parts by mass |

A coating fluid for a layer of a low refractive index C3 having the following composition was prepared and was filtered using a polypropylene filter having a pore diameter of 0.4 μm, thereby obtaining a coating fluid C3. This coating fluid was applied onto the layer of a high refractive index using a gravure coater. The drying conditions were set to 60° C. and 60 seconds, and the coating fluid was irradiated with ultraviolet rays at an irradiation amount of 300 mJ/cm² using a UV lamp having an illuminance of 100 mW/cm² in a nitrogen atmosphere so as to be hardened, thereby forming a layer of a low refractive index having a thickness of 0.095 μm and a refractive index of 1.343. Four layers of the hardcoat layer, the layer of an intermediate refractive index, the layer of a high refractive index, and the layer of a low refractive index were hardened (fully cured) at the same time by means of UV irradiation at this sufficient irradiation amount, thereby producing an antireflection layer-attached film 1 having a surface reflectivity of 0.4% at 530 nm.

(Coating Fluid for Layer of Low Refractive Index C3)

| | |
|---|---|
| Perfluoroolefin copolymer B3 | 14.8 parts by mass |
| Acrylic monomer-DPHA (manufactured by Nippon Kayaku Co., Ltd.) | 3.0 parts by mass |
| Hollow silica particle dispersion liquid D1 | 21.2 parts by mass |
| Photopolymerization initiator (IRGACURE 127 manufactured by BASF) | 1.3 parts by mass |
| Reactive silicone X22-164C (manufactured by Shin-Etsu Chemical Co., Ltd.) | 2.1 parts by mass |
| MEK | 157.7 parts by mass |

The perfluoroolefin copolymer B3 was prepared using the same method as for the perfluoroolefin copolymer (1) described in JP2010-152311A. The hollow silica particle dispersion liquid D1 was prepared using the same method as for the dispersion liquid A-1 described in JP2007-298974A by adjusting conditions. A hollow silica particle dispersion liquid (a concentration of solid contents of 18% by mass) having an average particle diameter of 60 nm, a shell thickness of 10 nm, and a refractive index of silica particles of 1.31 was produced.

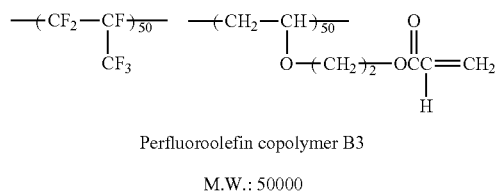

Perfluoroolefin copolymer B3

M.W.: 50000

In the structural formula, 50:50 indicates the molar ratio.

A UV hardening-type adhesive Exp. U12034-6 manufactured by DIC Corporation was applied onto a cellulose acylate film surface opposite to the antireflection layer using a wire bar at room temperature so that the thickness of the dried film after drying reached 5 μm. This coated surface and the surface of the glass plate-attached D3 layer on the liquid crystal layer side were attached together with attention paid to prevent air bubbles from entering therebetween and were irradiated with UV at 30° C. for 12 seconds using a D valve (lamp: 90 mW/cm) manufactured by Fusion at an output of 60%. After that, the glass substrate which served as a support for the D3 layer was peeled off.

Next, a UV hardening-type adhesive Exp. U12034-6 manufactured by DIC Corporation was applied onto this D3 layer using a wire bar at room temperature so that the thickness of the dried film after drying reached 5 μm. This coated surface and the surface of the PET film-attached R2 layer on the liquid crystal layer side were attached together with attention paid to prevent air bubbles from entering therebetween and were irradiated with UV at 30° C. for 12 seconds using a D valve (lamp: 90 mW/cm) manufactured by Fusion at an output of 60%. After that, the PET film which served as a support for the R2 layer was peeled off.

Subsequently, a UV hardening-type adhesive Exp. U12034-6 manufactured by DIC Corporation was applied onto this R2 layer using a wire bar at room temperature so that the thickness of the dried film after drying reached 5 μm. This coated surface and the surface of the PET film-attached R1 layer on the liquid crystal layer side were attached together with attention paid to prevent air bubbles from entering therebetween and were irradiated with UV at 30° C. for 12 seconds using a D valve (lamp: 90 mW/cm) manufactured by Fusion at an output of 60%. After that, the PET film which served as a support for the R1 layer was peeled off.

Figure 2A:
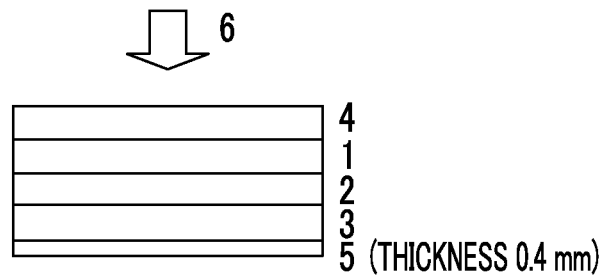
FIGS. 2A to 2C are views illustrating the layer constitution of a reflection member produced in an example and a light incidence direction.
Figure 2B:
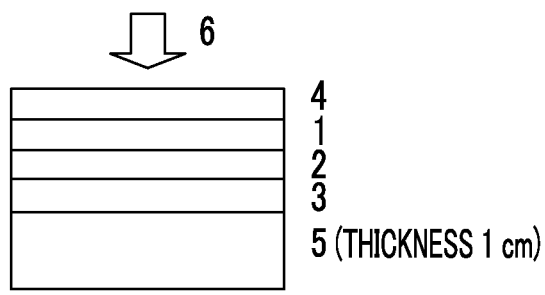
Figure 2C:
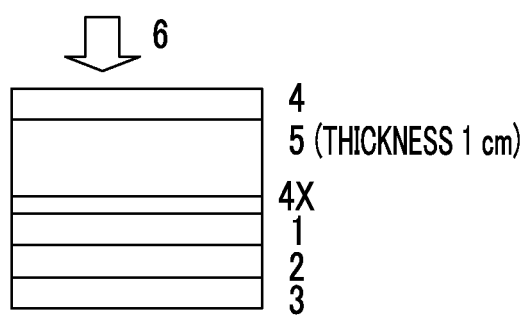

Finally, a UV hardening-type adhesive Exp. U12034-6 manufactured by DIC Corporation was applied onto a 0.4 mm-thick acrylic substrate using a wire bar at room temperature so that the thickness of the dried film after drying reached 5 μm. This coated surface and the R1 layer surface of the formed laminate film were attached together with attention paid to prevent air bubbles from entering therebetween and were irradiated with UV at 30° C. for 12 seconds using a D valve (lamp: 90 mW/cm) manufactured by Fusion at an output of 60%, thereby forming a reflection member 1 of Example 1. The size of the formed reflection member was 15 cm×30 cm, and a schematic sectional view of the film is illustrated in FIGS. 2A to 2C.

[Formation of Reflection Member 2 of Example 2]

A reflection member 2 of Example 2 was formed in the same manner as in the formation of the reflection member of Example 1 except for the fact that the D1 layer was used instead of the R1 layer which was used to form the reflection member of Example 1.

[Formation of Reflection Member 3 of Example 3]

A reflection member 3 of Example 3 was formed in the same manner as in the formation of the reflection member of Example 1 except for the fact that the R3 layer was used instead of the D3 layer which was used to form the reflection member of Example 1 and the D2 layer was used instead of the R2 layer.

[Formation of Reflection Member 4 of Example 4]

A reflection member 4 of Example 4 was formed in the same manner as in the formation of the reflection member of Example 1 except for the fact that the R3 layer was used instead of the D3 layer which was used to form the reflection member of Example 1 the D2 layer was used instead of the R2 layer, and the D1 layer was used instead of the R1 layer.

[Formation of Reflection Member 5 of Example 5]

A reflection member 5 of Example 5 was formed in the same manner as in the formation of the reflection member of Example 1 except for the fact that the DS3 layer was used instead of the D3 layer which was used to form the reflection member of Example 1, the RS2 layer was used instead of the R2 layer, and the DS1 layer was used instead of the R1 layer.

[Formation of Reflection Member 6 of Example 6]

A reflection member 6 of Example 6 was formed in the same manner as in the formation of the reflection member of Example 1 except for the fact that the RS3 layer was used instead of the D3 layer which was used to form the reflection member of Example 1, the DS2 layer was used instead of the R2 layer, and the RS1 layer was used instead of the R1 layer.

[Formation of Reflection Member 7 of Example 7]

A reflection member 7 of Example 7 was formed in the same manner as in the formation of the reflection member of Example 1 except for the fact that the R3 layer was used instead of the D3 layer which was used to form the reflection member of Example 1 and the D1 layer was used instead of the R1 layer.

[Formation of Reflection Member 8 of Example 8]

A reflection member 8 of Example 8 was formed in the same manner as in the formation of the reflection member of Example 1 except for the fact that the D2 layer was used instead of the R2 layer which was used to form the reflection member of Example 1.

[Formation of Reflection Member 9 of Comparative Example 1]

A reflection member 9 of Comparative Example 1 was formed in the same manner as in the formation of the screen of Example 1 except for the fact that the R3 layer was used instead of the D3 layer which was used to form the reflection member of Example 1.

[Formation of Reflection Member 10 of Comparative Example 2]

A reflection member 10 of Comparative Example 2 was formed in the same manner as in the formation of the reflection member of Example 1 except for the fact that the D2 layer was used instead of the R2 layer which was used to form the reflection member of Example 1 and the D1 layer was used instead of the R1 layer.

[Formation of Reflection Member 11 of Comparative Example 3]

A reflection member 11 of Comparative Example 3 was formed in the same manner as in the formation of the reflection member of Example 1 except for the fact that the RS3 layer was used instead of the D3 layer which was used to form the reflection member of Example 1, the RS2 layer was used instead of the R2 layer, and the RS1 layer was used instead of the R1 layer.

<Formation of Reflection Members 101 to 111 Having Layer Constitution (2)>

Reflection member 101 to reflection member 111 having a layer constitution (2) illustrated in FIGS. 2A to 2C were formed in the same manner as in the formation of the reflection members of Example 1 to Example 8 and Comparative Example 1 to Comparative Example 3 respectively except for the fact that 1 cm-thick acrylic plates having a front surface retardation of 5 nm were used instead of the 0.4 mm-thick acrylic plates which were used to form the reflection members of Example 1 to Example 8 and Comparative Example 1 to Comparative Example 3.

<Formation of Reflection Members 201 to 211 Having Layer Constitution (3)>

Reflection member 201 to reflection member 211 having a layer constitution (3) illustrated in FIG. 1 were formed in the same manner as in the formation of the reflection members of Example 1 to Example 8 and Comparative Example 1 to Comparative Example 3 respectively except for the fact that 40 µm-thick cellulose acylate films (FUJI-TAC TD-40 manufactured by Fujifilm Corporation) to which no antireflection layer were attached were used instead of the antireflection layer-attached cellulose acylate films which were used to form the reflection members of Example 1 to Example 8 and Comparative Example 1 to Comparative Example 3, and, in a state in which the 0.4 mm-thick acrylic plate was not attached thereto, a UV hardening-type adhesive Exp. U12034-6 was applied onto the surface of the cellulose acylate film to which the liquid crystal layer was not attached so as to attach a 1 cm-thick acrylic plate to the surface, and, furthermore, a UV hardening-type adhesive Exp. U12034-6 was applied onto the surface of the acrylic plate to which the liquid crystal layer was not formed so as to attach the side of the antireflection layer-attached cellulose acylate film used in Example 1 opposite to the antireflection layer with attention paid to prevent air bubbles from entering therebetween.

<Evaluation of Reflection Members>

1) The haze values shown in Table 3 are values obtained by measuring haze values with respect to C light sources using NDH-2000 manufactured by Nippon Denshoku Industries Co., Ltd.

2) The right circular polarization reflectivity with respect to 45-degree incidence rays in Table 3 was measured as described below. A device obtained by mounting an automatic absolute reflectivity measurement unit ARMN-735 in a V-670 ultraviolet, visible light, and near-infrared spectrophotometer manufactured by JASCO Corporation was used, a right circular polarization plate was inserted into an incidence ray source so as to set light to be incident at 45 degrees with respect to the film normal line, and the reflected light was trapped using an integrating sphere, thereby measuring the right circular polarization reflectivity.

3) Combiner Color Deviation

Figure 3:
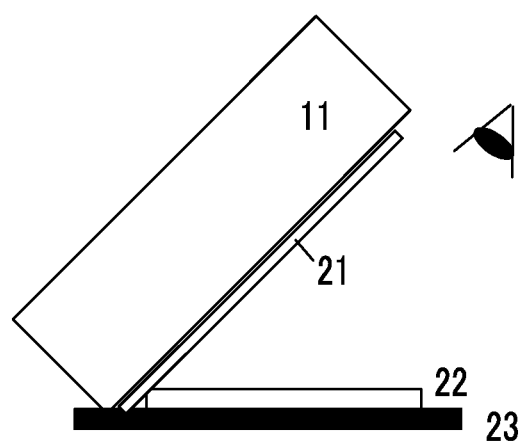
FIG. 3 is a view illustrating the disposition of a reflection member, a light source, and a circular polarization plate and a visual observation position in an evaluation of reflection unevenness of a reflection member produced in an example.

The uniformity of reflection unevenness in planes was evaluated as described below. A reflection member was horizontally installed on a black mat (black velvet) with the projected light side surface facing upwards. As illustrated in FIG. 3, light of a white Schaukasten having a right circular polarization plate attached to a light emission surface was radiated from above the upper surface of the reflection member, and the uniformity of reflected light color in planes was visually evaluated.

A Unevenness was invisible.

B Unevenness was observed but was not easily visible.

C Unevenness was observed.

4) Screen Color Deviation

Figure 4:
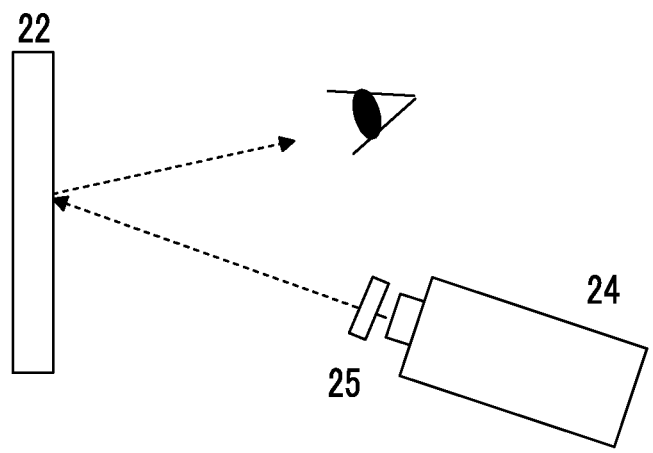
FIG. 4 is a view illustrating the disposition of a projector, a reflection member, and a λ/4 wavelength plate and a visual observation position in an evaluation of reflection unevenness of color unevenness when projected light is applied to a reflection member produced in an example from a projector.

Uniform white images were projected in a disposition illustrated in FIG. 4 using a liquid crystal projector DLA-X55 manufactured by JVC, and tints were visually evaluated using the following standards.

A: The full screen appeared white.

B: A majority of the screen appeared white (permitted).

C: Color unevenness was clearly observed.

5) Double images were evaluated as described below. Green laser point light was made incident in the light incidence direction of FIGS. 2A to 2C in a dark room, and the brightness of reflected images on surfaces on which cholesteric liquid crystal layers were absent was visually observed.

A Double images were not observable.

B Double images were not easily observable (permitted).

C Double images were significantly observable.

6) Circular Polarization Isolation Ratio

The polarization states of transmitted light were measured using AxoScan manufactured by AXOMETRICS, Inc. with the tilt angle of films set to 45 degrees.

A The average value of the degree of circular polarization at three peak wavelengths was 0.90 or higher.

B The average value of the degree of circular polarization at three peak wavelengths was lower than 0.90 and 0.80 or higher (permitted).

C The average value of the degree of circular polarization at three peak wavelengths was lower than 0.80.

TABLE 2

| | First layer | | | | Second layer | | | | Third layer | | | |
|---|---|---|---|---|---|---|---|---|---|---|---|---|
| | Liquid crystal selective reflection layer | Selective reflection central wavelength | Layer thickness/μm | Rth/nm | Liquid crystal selective reflection layer | Selective reflection central wavelength | Layer thickness/μm | Rth/nm | Liquid crystal selective reflection layer | Selective reflection central wavelength | Layer thickness/μm | Rth/nm |
| Example | | | | | | | | | | | | |
| 1 | D3 | 475 nm | 3.5 | −208 | R2 | 550 nm | 3.1 | +245 | R1 | 665 nm | 3.7 | +295 |
| 2 | D3 | 475 nm | 3.5 | −208 | R2 | 550 nm | 3.1 | +245 | D1 | 665 nm | 4.9 | −295 |
| 3 | R3 | 475 nm | 2.6 | +208 | D2 | 550 nm | 4.1 | −245 | R1 | 665 nm | 3.7 | +295 |
| 4 | R3 | 475 nm | 2.6 | +208 | D2 | 550 nm | 4.1 | −245 | D1 | 665 nm | 4.9 | −295 |
| 5 | DS3 | 475 nm | 3.5 | −208 | RS2 | 550 nm | 3.1 | +245 | DS1 | 665 nm | 4.9 | −295 |
| 6 | RS3 | 475 nm | 2.6 | +208 | DS2 | 550 nm | 4.1 | −245 | RS1 | 665 nm | 3.7 | +295 |
| 7 | R3 | 475 nm | 2.6 | +208 | R2 | 550 nm | 3.1 | +245 | D1 | 665 nm | 4.9 | −295 |
| 8 | D3 | 475 nm | 3.5 | −208 | D2 | 550 nm | 4.1 | −245 | R1 | 665 nm | 3.7 | +295 |
| Comparative Example | | | | | | | | | | | | |
| 1 | R3 | 475 nm | 2.6 | +208 | R2 | 550 nm | 3.1 | +245 | R1 | 665 nm | 3.7 | +295 |
| 2 | D3 | 475 nm | 3.5 | −208 | D2 | 550 nm | 4.1 | −245 | D1 | 665 nm | 4.9 | −295 |
| 3 | RS3 | 475 nm | 2.6 | +208 | RS2 | 550 nm | 3.1 | +245 | RS1 | 665 nm | 3.7 | +245 |

TABLE 3

Evaluation result

| | | Right circular polarization reflectivity with respect to 45-degree incidence light/% Layer constitution (1) | | | Layer constitution (1) used as combiners Combiner peripheral portion color deviation | Layer constitution (1) used as projector screens Color deviation in peripheral portion | Combiner layer constitution (2) with Ch + base material of low refractive index constitution Presence or absence of double images at 30-degree slope | Combiner layer constitution (3) of AR + base material + Ch Presence or absence of double images at 30-degree slope | Layer constitution (1) used as dichroic mirrors Circular polarization isolation ratio |
|---|---|---|---|---|---|---|---|---|---|
| | Haze value (%) | First layer | Second layer | Third layer | | | | | |
| Example | | | | | | | | | |
| 1 | 0.2 | 97 | 95 | 91 | A | — | A | A | A |
| 2 | 0.3 | 98 | 92 | 95 | A | — | A | A | A |
| 3 | 0.2 | 97 | 93 | 92 | A | — | A | A | A |
| 4 | 0.3 | 97 | 91 | 95 | A | — | A | A | A |
| 5 | 15.8 | 98 | 92 | 95 | — | A | — | — | — |
| 6 | 15.3 | 97 | 93 | 92 | — | A | — | — | — |
| 7 | 0.2 | 97 | 76 | 70 | B | — | B | B | B |
| 8 | 0.2 | 98 | 85 | 78 | B | — | B | B | B |
| Comparative Example | | | | | | | | | |
| 1 | 0.2 | 98 | 75 | 52 | C | — | C | C | C |
| 2 | 0.3 | 97 | 82 | 67 | C | — | C | C | C |
| 3 | 15.2 | 98 | 75 | 52 | — | C | — | — | — |

EXPLANATION OF REFERENCES

1: first layer in which cholesteric liquid crystalline phases were fixed
2: second layer in which cholesteric liquid crystalline phases were fixed
3: third layer in which cholesteric liquid crystalline phases were fixed
4: antireflection layer-attached cellulose acylate film
4X: cellulose acylate film
5: base material
6: light incidence direction
11: light source
12: drawing device
13: concave reflection mirror
14: housing
15: window portion
21: circular polarization plate
22: reflection member
23: black velvet
24: projector
25: ¼ wavelength phase difference plate

What is claimed is:

1. A reflection member comprising:
   two or more layers of fixed cholesteric liquid crystal phases,
   wherein the two or more layers of fixed cholesteric liquid crystal phases exhibit central wavelengths of mutually different selective reflection,
   the two or more layers of fixed cholesteric liquid crystal phases include a layer formed of a composition including a disc-like liquid crystal compound and a layer formed of a composition including a rod-like liquid crystal compound, and the difference in the absolute value of Rth at a wavelength of 550 nm between the layer formed of a composition including a disc-like liquid crystal compound and the layer formed of a composition including a rod-like liquid crystal compound is 100 nm or smaller.

2. The reflection member according to claim 1, wherein, out of the two or more layers of fixed cholesteric liquid crystal phases, two layers closest to any one surface side of the reflection member consist of the layer formed of a composition including a disc-like liquid crystal compound and the layer formed of a composition including a rod-like liquid crystal compound.

3. The reflection member according to claim 2 which is a film for forming projected images using reflected light on the above-described surface side.

4. The reflection member according to claim 3, comprising:
a layer of fixed cholesteric liquid crystal phase which has a central wavelength of selective reflection in a red wavelength range;
a layer of fixed cholesteric liquid crystal phase which has a central wavelength of selective reflection in a green wavelength range; and
a layer of fixed cholesteric liquid crystal phase which has a central wavelength of selective reflection in a blue wavelength range.

5. The reflection member according to claim 1 which is a film for forming projected images using reflected light.

6. The reflection member according to claim 1, comprising:
a layer of fixed cholesteric liquid crystal phase which has a central wavelength of selective reflection in a red wavelength range;
a layer of fixed cholesteric liquid crystal phase which has a central wavelength of selective reflection in a green wavelength range; and
a layer of fixed cholesteric liquid crystal phase which has a central wavelength of selective reflection in a blue wavelength range.

7. The reflection member according to claim 6, wherein the red wavelength range is 600 mil to 650 nm, the green wavelength range is 500 nm to 600 nm, and the blue wavelength range is 430 nm to 480 nm.

8. The reflection member according to claim 1, wherein a haze value measured from any one surface is 2.0% or higher.

9. A projection screen comprising:
the reflection member according to claim 8.

10. The projection screen according to claim 9, wherein out of the two or more layers of fixed cholesteric liquid crystal phases, two layers closest to a surface on the projected image display side consist of the layer formed of a composition including a disc-like liquid crystal compound and the layer formed of a composition including a rod-like liquid crystal compound.

11. A combiner for head up displays comprising:
the reflection member according to claim 1.

12. The combiner for head up displays according to claim 11,
wherein, out of the two or more layers of fixed cholesteric liquid crystal phases, two layers closest to a surface on the projected image display side consist of the layer formed of a composition including a disc-like liquid crystal compound and the layer formed of a composition including a rod-like liquid crystal compound.

13. The combiner for head up displays according to claim 11, comprising:
the two or more layers of fixed cholesteric liquid crystal phases and a base material in this order, and an antireflection layer(s) on any one or both surface(s).

14. The combiner for head up displays according to claim 11, comprising:
a base material;
the two or more layers of fixed cholesteric liquid crystal phases; and
an antireflection layer in this order,
wherein an in-plane retardation in the base material at a wavelength of 550 nm is 50 nm or less.

15. The combiner for head up displays according to claim 14,
wherein, out of the two or more layers of fixed cholesteric liquid crystal phases, two layers closest to a surface on the projected image display side consist of the layer formed of a composition including a disc-like liquid crystal compound and the layer formed of a composition including a rod-like liquid crystal compound.

16. The combiner for head up displays according to claim 11, comprising:
the two or more layers of fixed cholesteric liquid crystal phases;
a base material; and
an antireflection layer in this order.

17. The combiner for head up displays according to claim 16,
wherein out of the two or more layers of fixed cholesteric liquid crystal phases, two layers closest to a surface on the projected image display side consist of the layer formed of a composition including a disc-like liquid crystal compound and the layer formed of a composition including a rod-like liquid crystal compound.

18. A heat shield member comprising:
the reflection member according to claim 1.

19. The heat shield member according to claim 18, comprising:
a ¼ wavelength phase difference plate.

* * * * *